United States Patent
Wang et al.

(10) Patent No.: US 10,451,447 B2
(45) Date of Patent: Oct. 22, 2019

(54) POLARIZATION-DEPENDENT POSITION ENCODER

(71) Applicants: Mitsubishi Electric Research Laboratories, Inc., Cambridge, MA (US); Mitsubishi Electric Corporation, Chiyoda-Ku, Tokyo (JP)

(72) Inventors: Bingnan Wang, Belmont, MA (US); Wataru Tsujita, Tokyo (JP); Kota Sadamoto, Tokyo (JP); Yoshitsugu Sawa, Tokyo (JP)

(73) Assignees: Mitsubishi Electric Research Laboratories, Inc., Cambridge, MA (US); Mitsubishi Electric Corpotation, Tokyo (JP)

( * ) Notice: Subject to any disclaimer, the term of this patent is extended or adjusted under 35 U.S.C. 154(b) by 45 days.

(21) Appl. No.: 15/911,861

(22) Filed: Mar. 5, 2018

(65) Prior Publication Data
US 2019/0204120 A1      Jul. 4, 2019

Related U.S. Application Data

(60) Provisional application No. 62/613,478, filed on Jan. 4, 2018.

(51) Int. Cl.
*G01D 5/34* (2006.01)
*G01D 5/347* (2006.01)

(52) U.S. Cl.
CPC ......... *G01D 5/34715* (2013.01); *G01D 5/345* (2013.01)

(58) Field of Classification Search
CPC .................... G01D 5/34715; G01D 5/345
USPC ....................................................... 250/340
See application file for complete search history.

(56) References Cited

U.S. PATENT DOCUMENTS

| | | | |
|---|---|---|---|
| 7,191,943 B2 | 3/2007 | Sewell et al. |
| 7,304,294 B2 | 12/2007 | Chin |
| 9,638,582 B2 | 5/2017 | Tomioka |
| 9,846,063 B2 | 12/2017 | Vokinger et al. |
| 2006/0050285 A1 | 3/2006 | Weller |
| 2014/0036265 A1 | 2/2014 | Tsujita et al. |
| 2015/0233742 A1 | 8/2015 | Vokinger et al. |
| 2015/0369637 A1 | 12/2015 | Kidd et al. |

FOREIGN PATENT DOCUMENTS

WO      20060050285 A1      8/2005

*Primary Examiner* — David P Porta
*Assistant Examiner* — Gisselle M Gutierrez
(74) *Attorney, Agent, or Firm* — Gennadiy Vinokur; James McAllenan; Hironori Tsukamoto

(57) ABSTRACT

An encoder includes a layered structure including a metal plate, a dielectric layer arranged on the metal plate, and a plurality of metallic components arranged on the dielectric layer to form a pattern of resonant circuits. The encoder includes an emitter to emit a waveform of a resonant frequency to the layered structure and a receiver to measure amplitudes of the waveform reflected from the layered structure. The processor operatively connected to a memory storing data relating positions of the emitter with amplitudes of the reflected waveform determines a position of the emitter from the measurements of the amplitudes based on the data. The encoder includes an output interface to render the position of the emitter.

16 Claims, 36 Drawing Sheets

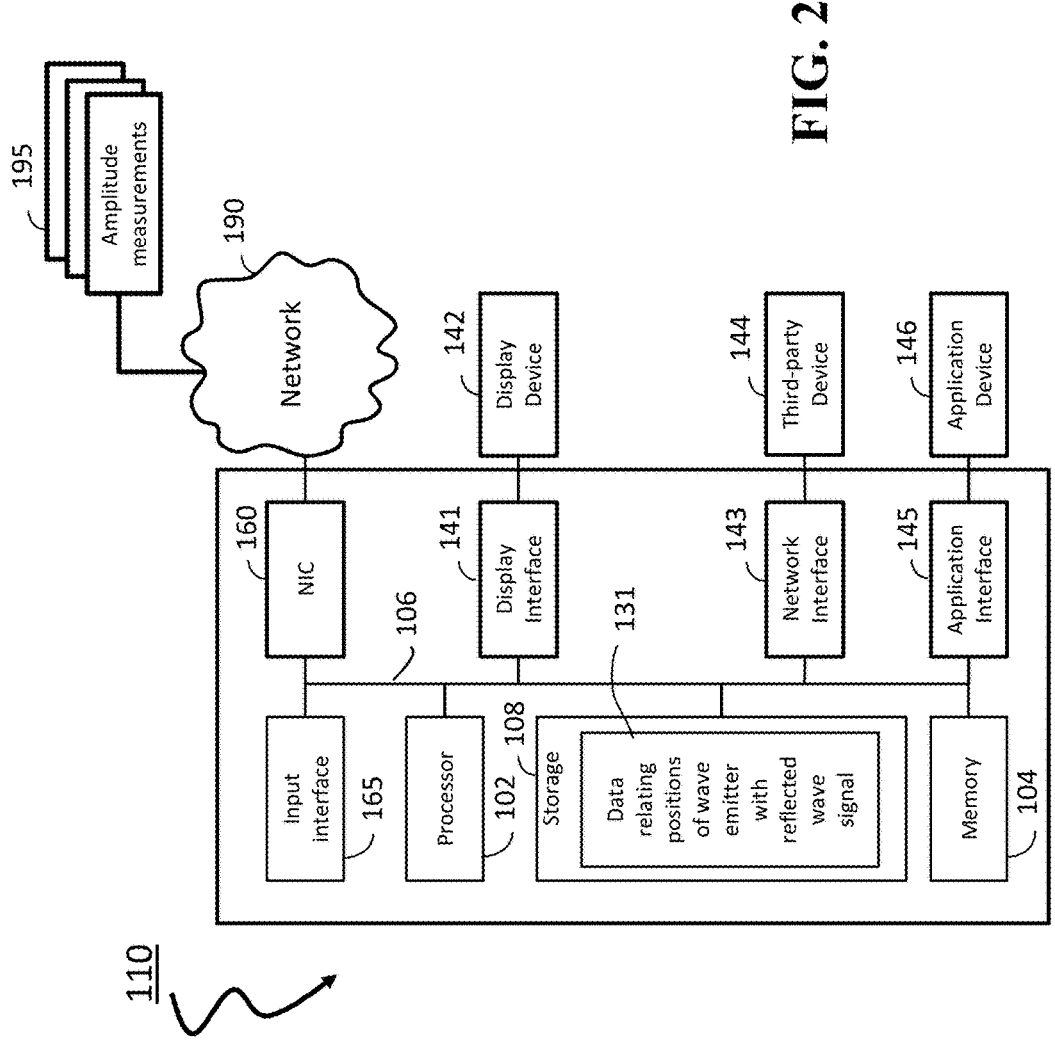

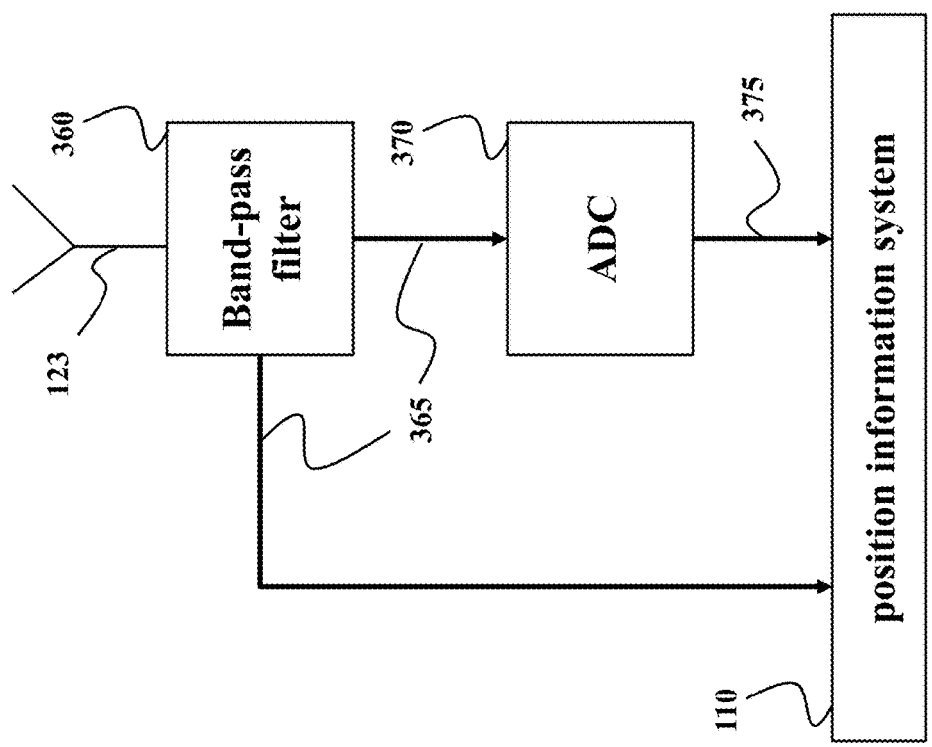

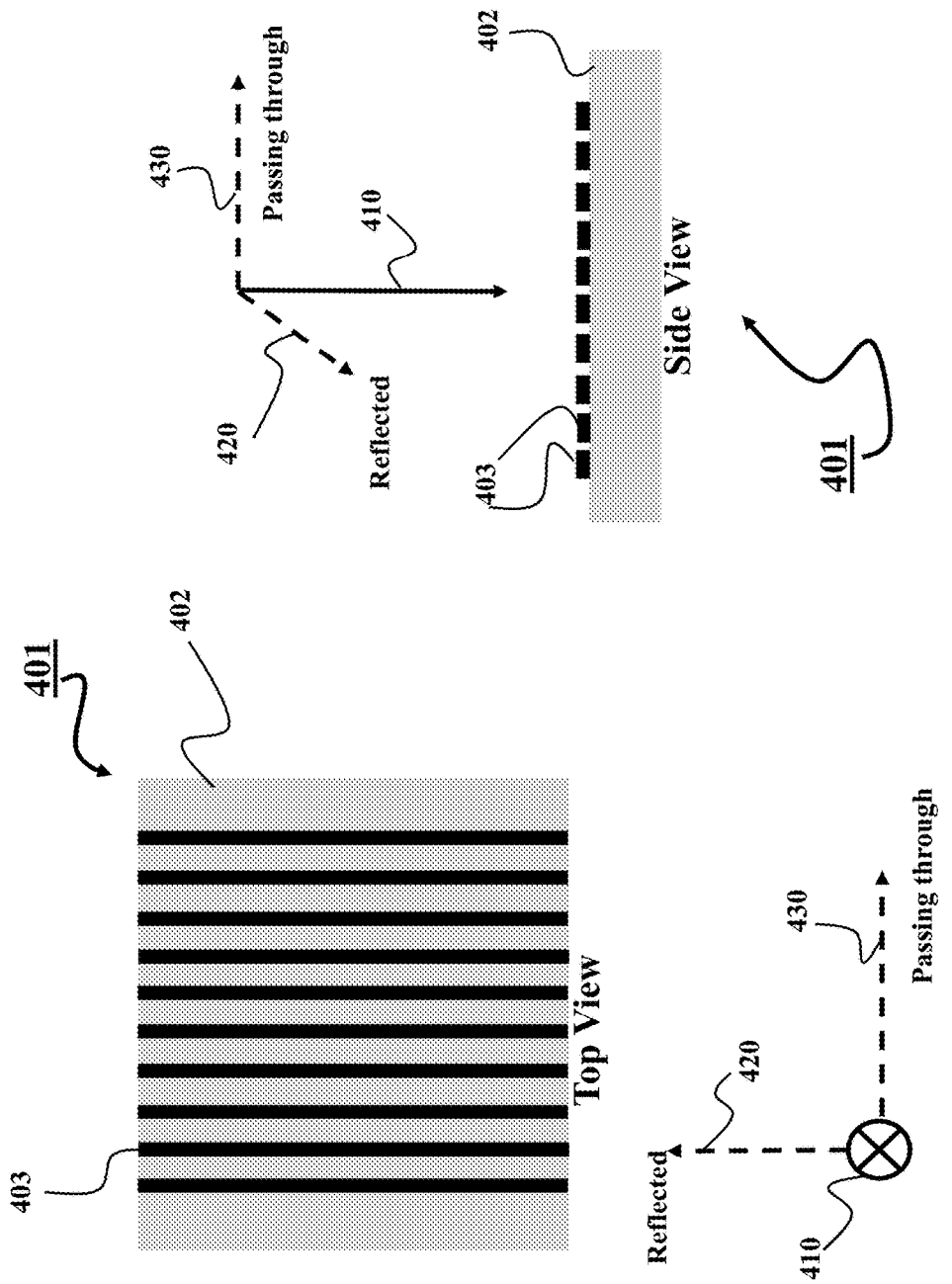

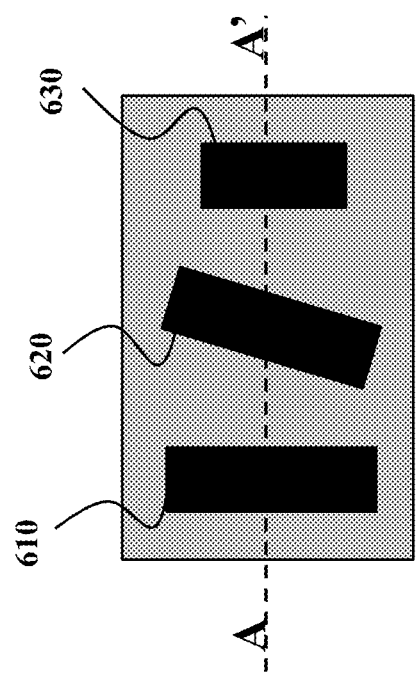
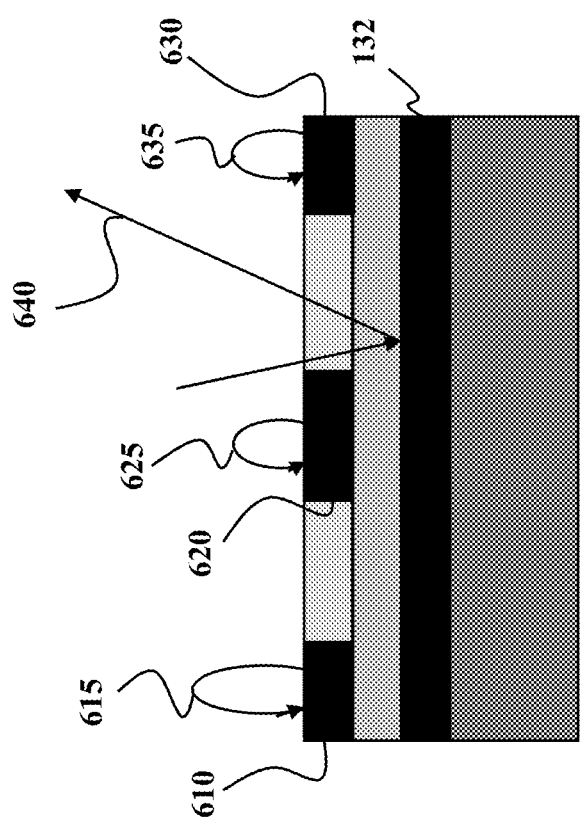
FIG. 6A
FIG. 6B

1030

| 1031 | 1032 |
|---|---|
| 00011011 | Position 1 |
| 00011010 | Position 2 |
| 00011001 | Position 3 |
| 00011000 | Position 4 |
| 00011111 | Position 5 |
| 10010011 | Position 6 |
| 10010011 | Position 7 |

FIG. 10B

Look-up Table of 2-bit Barcode Based on Multi-Frequency

| | Polarization angle 0 degree | Polarization angle 90 degree |
|---|---|---|
| Frequency f1 | "00" | "01" |
| Frequency f2 | "10" | "11" |

Look-up Table of 3-bit Barcode
Based on Multi-Frequency and Multi-Angle

| | Polarization angle 0 degree | Polarization angle 30 degree | Polarization angle 60 degree | Polarization angle 90 degree |
|---|---|---|---|---|
| Frequency f1 | "000" | "001" | "010" | "011" |
| Frequency f2 | "100" | "101" | "110" | "111" |

Look-up Table of 3-bit Barcode Based on Multi-Frequency and Multi-Angle

| | Polarization angle 0 degree | Polarization angle 90 degree | Polarization angle 45 degree |
|---|---|---|---|
| Freq f1 | "000" | "001" | "010" |
| Freq f2 | "011" | "100" | "101" |
| Freq f3 | "110" | "111" | "NaN" |

POLARIZATION-DEPENDENT POSITION ENCODER

TECHNICAL FIELD

This invention generally relates to contactless encoders, and more particularly to encoder measuring position based on reflection of polarized waveform.

BACKGROUND

Encoders for position measurement are required in many fields of application, in which the position of an element movable along a path, for example, the position of a machine component on a linear axis such as drives or pivot arms, is to be determined. The positions detected in this case can be used as position values for measuring purposes, or also for positioning components by way of a drive having a position control loop. Such position encoders are accordingly used in devices such as coordinate measuring machines (CMM), geodetic devices, robot arms, elevators, train systems, radar, sonar, communications, acoustics, optics or hydraulic actuators.

An encoder has for this purpose a scale and a read head for the scanning thereof, which are movable in relation to one another, as well as a processor for regulating measurement operations and for assigning a position value, which is recorded by the read head, to a scanning signal. Depending on the requirements and structural options, either the read head is stationary and the scaler is movable, or the scaler is fixedly positioned and the read head is moved in relation thereto.

The scanning of the scaler is performed in a contactless manner and generally based on optical, inductive, magnetic, or capacitive physical principles. For example, the read head can have a light source, which irradiate a scaler having light-reflective or light-scattering (reflected light scanning) or light-transmitting (transmitted light scanning) markings with light. The light is incident therefrom on a light-sensitive pickup of a sensor, for example, on a photocell or a CCD array. If the scaler has light-reflective markings, the sensor is attached on the same side of the read head as the illuminating means. In the other case, the read head laterally encloses the scaler and sensor and illuminating means are arranged approximately opposite to one another in/at/on the read head. The markings are used as code elements for coding the relative position of the read head in relation to the scaler. The coding can be implemented as an incremental code, for example, by alternating similar light/dark transitions, moiré patterns, or, for measurement methods other than optical measurement methods, as an electrical or magnetic poles, or as an absolute code, for example, by a number of defined different patterns. See, e.g., U.S. 2015/0233742.

The accuracy of the position depends on resolution of the scaler, frequency of the transmitted signal, and sensibility of the encoder to the scattering events caused by dust and dirt in industrial environment. Accordingly, there is a need to improve the accuracy of estimation of relative position of the encoder suitable for industrial applications in dusty and smoky environment.

SUMMARY

Some embodiments are based on understanding that polarization-dependent encoder can be adapted for high frequency position sensing. In such an encoder, an emitter transmits polarized signal to the barcode and a receiver detects the reflected signal from the barcode. The barcode is designed such that different parts of the barcode respond differently to the polarized incident waveform. For example, the barcode can reflect or absorb the emitted signal to encode in the reflected signal the position of the emitter.

Some embodiments are based on recognition, that such a polarization-dependent encoder is suitable for THz position sensing or other sensing applications. For example, compared with low frequency counterparts of inductive and capacitive encoders, THz based encoder can achieve much better resolution; compared with optical encoders, THz based encoder has lower attenuation due to scattering, making the THz based encoder more suitable for industrial applications in dusty and smoky environment.

Some embodiments are based on understanding that the polarization-dependent encoder can be enabled with a barcode implemented via a polarizer that reflects one polarization while pass through the other to encode the position of emitter of the polarized wave. However, objects behind the polarizer, including substrate to support the polarizer, can cause additional reflection back to the receiver of the encoder, which introduces noises to the sensing system.

For example, polarizers designed using wire grating film respond differently to polarized signal. For one orientation of the wires where electric field is parallel to the wires, the signal is reflected back; for another orientation of the wires where electric field is perpendicular to the wires, the signal passes through. If additional materials are added to the polarizer, e.g., as substrate, additional reflection can happen to the polarized signal that passes through. Objects behind the wire grating film can also result in the additional reflection corrupting the reflected signal. Therefore, there is a need to design a polarizer that is mechanically stable and less susceptible to noises due to reflection from external objects.

Some embodiments are based on understanding that one of the cause of the drawbacks of the polarizers is in the principles of their default operations letting the incident waveforms to pass through. Specifically, the polarizers pass through all incident waveforms unless something is done to reflect the waveforms. For example, the wire grating polarizer passes through the incident waveforms unless the grating is rotated to reflect the waves. In such a manner, the positioned is encoded in reflection of the signal making such a polarizer vulnerable to undesirable reflections corrupting the reflected signal.

Some embodiments are based on realization that it is possible to transform the principles of operations of the polarizers. Specifically, it is possible to design such a polarizer that reflects all incident waveforms unless something is done to absorb the waves. In such a manner, the position of the emitter is encoded in the absorption of the signal, reducing dependency on the incidental reflection. In addition, the principle of default reflection can help to achieve mechanical stability of the polarizer.

To that end, some embodiments are based on realization that a layered structure including a metal plate, a dielectric layer arranged on the metal plate, and a plurality of metallic components arranged on the dielectric layer to form a plurality of resonant circuits can enable such a polarizer. Specifically, the metal plate provides a mechanical support for the polarizer and prevent the signal to pass through the polarizer. Such a metal plate provides default reflection of the incident waveform. In addition, the resonant circuits formed by the layered structure absorb the reflected signal as the function of the arrangements, orientations and geometrical parameters of the metallic components of the layered structure. Such an absorption, e.g., partial or complete, can encode the position of the encoder.

For example, when the resonant frequency of the resonant circuit equals the resonant frequency of the polarized signal and the orientation of the resonant circuit is aligned with the with the direction of the polarization of the emitted signal, the resonant circuit absorbs the incident polarized signal of the resonant frequency. By varying the orientation and dimensions of the metallic components, the ratio of the absorption can be varied. To that end, a portion of the layered structure occupied by a metallic component forming a resonant circuit absorbs at least a portion of the waveform and a portion of the layered structure free from the metallic component reflects the polarized waveform from the metallic plate.

The position of the emitter with respect to the layered structure can be encoded as data indicative of one or combination of positions of the resonant circuits with respect to each other, resonant frequencies of the resonant circuits with respect to the frequency of the waveform, and orientations of resonant circuits with respect to the direction of the polarization of the waveform. Such data can relate the position of the encoder with the measurements of the amplitude of the reflected data. For example, in one embodiment the data includes a mapping between sequences of amplitude values and the position of the emitter, such that the processor of the encoder can map the measurements of the amplitudes to the position of the emitter according to the mapping.

Accordingly, one embodiment discloses an encoder having a layered structure including a metal plate, a dielectric layer arranged on the metal plate, and a plurality of metallic components arranged on the dielectric layer to form a plurality of resonant circuits. The encoder includes an emitter to emit a waveform of a resonant frequency to the layered structure and a receiver to measure amplitudes of the waveform reflected from the layered structure. The waveform is a transverse wave polarized to oscillate along a direction of polarization. The encoder includes a memory to store data indicative of one or combination of positions of the resonant circuits with respect to each other, resonant frequencies of the resonant circuits with respect to the frequency of the waveform, and orientations of resonant circuits with respect to the direction of the polarization of the waveform, a processor to determine a position of the emitter from the measurements of the amplitudes based on the data, and an output interface to render the position of the emitter.

The data encodes position of the emitter as a function of the absorption of the polarized waveform that depends on the directions of the polarization of the waveform. For example, in one embodiment, the data includes a plurality of mappings determined for different directions of the polarization of the waveform, wherein the processor selects a mapping based on the direction of the polarization of the waveform emitted by the emitter and maps the measurements of the amplitudes to the position of the emitter according to the mapping.

The emitted waveform is absorbed due to properties of the resonant circuit, which has strong electric currents circulating around, and converts the energy into heat. To that end, in some embodiments, geometrical parameters of the metallic components are functions of the resonant frequency. In some implementations, the resonant frequency is in a THz spectrum. For example, the metallic component arranged on the dielectric layer at a distance from the metallic plate forms an inductor with inductance governed by the resonant frequency. Similarly, at least two metallic components are position at a distance to each other to form a capacitor with capacitance governed by the resonant frequency. The geometrical parameters and mutual arrangement of the metallic components can vary to tune the resonant frequency of the resonant circuits.

In some implementations, the metallic components have the same geometrical parameters including the same shape and dimensions to simplify manufacturing process. However, the geometrical parameters of different metallic components can vary. Additionally, or alternatively, to facilitate implementation and position encoding, a group of metallic components are arranged in a pattern forming a unit cell, and wherein the layered structure includes a plurality of unit cells to encode the position. For example, a value of an amplitude of the waveform reflected from the portion of the layered structure occupied by a unit cell can form a unit or a pixel of signal analyzed by the processor to determine the position of the emitter. For example, the plurality of unit cells can form a periodic pattern and/or form a barcode encoding values of the position of the encoder.

BRIEF DESCRIPTION OF THE DRAWING

The presently disclosed embodiments will be further explained with reference to the attached drawings. The drawings shown are not necessarily to scale, with emphasis instead generally being placed upon illustrating the principles of the presently disclosed embodiments.

FIG. 2 shows a block diagram of a computer-based position information system in accordance with some embodiments.

FIG. 3B shows a block diagram of a receiver to measure amplitudes of the waveform reflected from the layered structure according to some embodiments.

FIGS. 4A and 4B show schematics illustrating properties of a polarized signal used by some embodiments to encode the positions.

FIGS. 6A and 6B show schematics of examples of encoding the position using metallic components of the layered structure according to some embodiments.

FIG. 10B shows a lookup table providing a mapping between sequences of amplitude values of the reflected wave and the position of the emitter according to one embodiment.

FIG. 17B shows a lookup table with codes designed by one embodiment for different frequencies of FIG. 17A.

FIG. 21A shows a lookup table designed for multi-bit barcode according to one embodiment.

FIGS. 21B and 21C show examples of 3-bit barcode based on multiple frequency and multiple orientations according to one embodiment.

DETAILED DESCRIPTION

Figure 1:
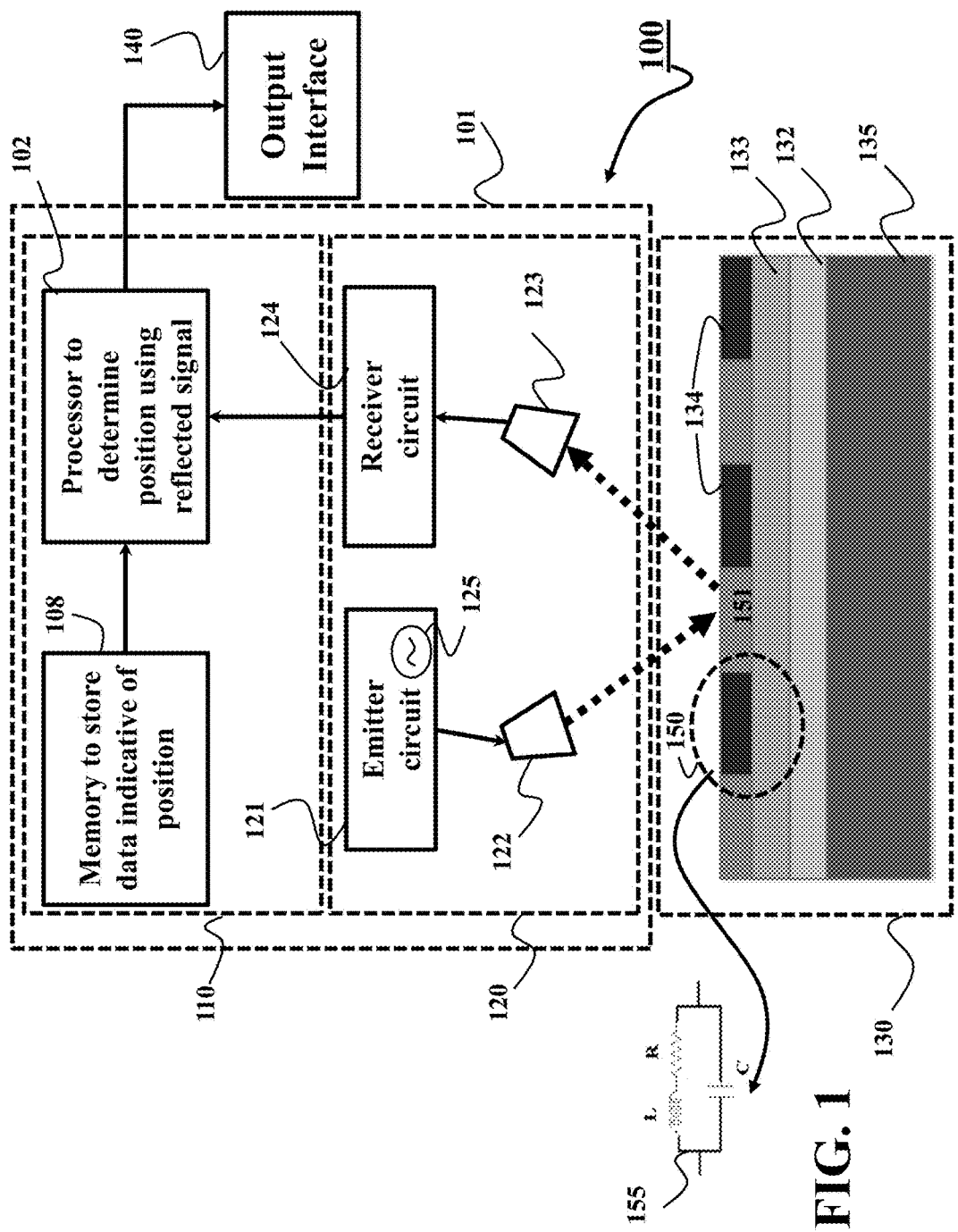
FIG. 1 shows a schematic of an encoder according to some embodiments.

FIG. 1 shows a schematic of an encoder 100 according to some embodiments. The encoder 100 is a polarization-dependent position encoder that encodes the position, at least in part, in the absorption of the polarized waveform. To that end, the encoder 100 includes a layered structure 130 to encode the position based on reflection and/or absorption of the incident polarized waveform emitted by an emitter 121. The layered structure 130 includes a metal plate 132, a dielectric layer 133 arranged above the metal plate, and a plurality of metallic components 134 arranged above the dielectric layer. Due to this arrangement, at least a portion 150 of the layered structure including the metallic component 134 forms a resonant circuit 155, such that the plurality of metallic components 134 arranged on the dielectric layer form a pattern of resonant circuits. Such a pattern of resonant circuits is used by some embodiments for position encoding and decoding. The layered structure 130 can also include a substrate 135 to provide the mechanical support to the layers of the layered structure.

Some embodiments are based on realization that the layered structure 130 enables a polarizer that either reflect all incident waveforms, unless the waves are absorbed. In such a manner, the position can be encoded with default reflection and the absorption of the signal, reducing dependency on the incidental reflection. In addition, the principle of default reflection can help to achieve mechanical stability of the polarizer. Specifically, the metal plate 132 provides a mechanical support for the polarizer and prevent the signal to pass through the polarizer. Such a metal plate provides default reflection of the incident waveforms. In addition, the resonant circuits formed by the layered structure absorb the reflected signal as the function of the arrangements, orientations and geometrical parameters of the metallic components of the layered structure. Such an absorption, e.g., partial or complete, is used by some embodiments to encode the positions.

For example, in some implementations, the portion 150 of the layered structure occupied by a metallic component form a resonant circuit 155 that absorbs at least a portion of the waveform in dependence on the geometrical parameters of the metallic component. For example, the geometrical parameters of the metallic component are selected to form the resonant circuit 155 having the resonant frequency of the incident polarized waveform. In such a manner, at least the portion of the incident polarized waveform can be absorbed by the resonant circuit and be dissipated as heat. In contrast, a portion 151 of the layered structure free from the metallic component reflects the polarized waveform from the metallic plate 132.

The encoder 100 also includes a position information system 110 and a polarized waveform system 120 to form at least part of a position detector 101 capable to be in relative motion with the layered structure 130. For example, in some implementations, the layered structure 130 is fixed to a fixed body such as a railroad track or an elevator wall, while the position detector 101 is fixed to a mobile object such as a train and an elevator car. In such a manner, the encoder 100 can be used for detecting the position of the mobile object on the transfer pathway.

The polarized waveform system 120 includes an emitter 121 to emit a polarized waveform of a resonant frequency to the layered structure. The waveform is a transverse wave polarized to oscillate along a direction of polarization. The emitter 121 can generate such a waveform using an oscillator 125 and transmit the waveform via free space to the layered structure 130 from the antenna 122.

The polarized waveform system 120 includes a receiver 124 to measure amplitudes of the waveform reflected from the layered structure and collected by an antenna 123 of the receiver 124. The measurements of the reflected waveform are submitted to the position information system 110 to determine the position of the position detector 101 and/or the emitter 121 and to render the position to an output interface 140.

The position information system 110 includes a memory 108 to store data indicative of positions of the emitter and a processor 102 to determine a position of the emitter from the measurements of the amplitudes based on the data indicative of the pattern formed by the resonant circuits 155. In some embodiments, the data include one or combination of positions of the resonant circuits with respect to each other, resonant frequencies of the resonant circuits with respect to the resonant frequency of the waveform, and orientations of resonant circuits with respect to the direction of the polarization of the waveform.

FIG. 2 shows a block diagram of a computer-based position information system 110 in accordance with some embodiments. The position information system 110 includes a processor 102 configured to execute stored instructions, as well as a memory 104 that stores instructions that are executable by the processor. The processor 102 can be a single core processor, a multi-core processor, a computing cluster, or any number of other configurations. The memory 104 can include random access memory (RAM), read only memory (ROM), flash memory, or any other suitable memory systems. The processor 102 is connected through a bus 106 to one or more input and output devices.

These instructions implement a position estimation of the emitter based on reflection and absorption of the polarized wave emitted by the emitter. Notably, the emitter is rigidly arranged within the position detector 101 and the position of the emitter is a direct indication of the position of the position detector 101. In this disclosure, the positions of the emitter the detector are used interchangeably.

The position information system 110 can also include a storage device or memory 108 adapted to store data 131 indicative of positions of the emitter. Specifically, the data 131 relates positions of wave emitter with reflected wave signal based on the pattern of the resonant circuits formed by the layered structure. Examples of the data 131 include one or combination of positions of the resonant circuits with respect to each other, resonant frequencies of the resonant circuits with respect to the resonant frequency of the waveform, and orientations of resonant circuits with respect to the direction of the polarization of the waveform. Examples of the data 131 also include a signal model of the reflected signal designed based on the pattern of the resonant circuits and a code including a sequence of bits representing the pattern of the resonant circuits.

The storage device 108 can be implemented using a hard drive, an optical drive, a thumbdrive, an array of drives, or any combinations thereof. Additionally, or alternatively, the storage device can be implemented as the memory 104. In some implementations, the memories 104 and 108 are merged into one non-transitory computer readable storage medium.

The position information system 110 includes an output interface 140 to render the estimated position. In some embodiments, the output interface 140 includes a display interface 141 adapted to connect the processor to a display device 142. The display device can include a camera, computer, scanner, mobile device, webcam, or any combination thereof. In some embodiments, the output interface 140 includes a printer interface adapted to connect the encoder to a printing device. In some embodiments, the output interface 140 includes a network interface 143 adapted to connect the processor to one or several devices 144 on the network. In some embodiments, the output interface 140 is an application interface 145 to submit the estimated position to a position based application devices 146, such as a controller controlling the motion of the mobile object such as the elevator car or the train.

The position information system 110 also includes an input interface 165 to receive the measurements 195 of the amplitude of the reflected signal. For example, a network interface controller 160 can be adapted to connect the position information system 110 through the bus 106 to a network 190. The network 190 can be implemented as the wired or wireless network. Through the network 190 and/or other implementations of the input interface 165, the measurements 195 of the amplitude of the reflected signal can be downloaded and stored within the computer's storage system 108 for storage and/or further processing.

Figure 3A:
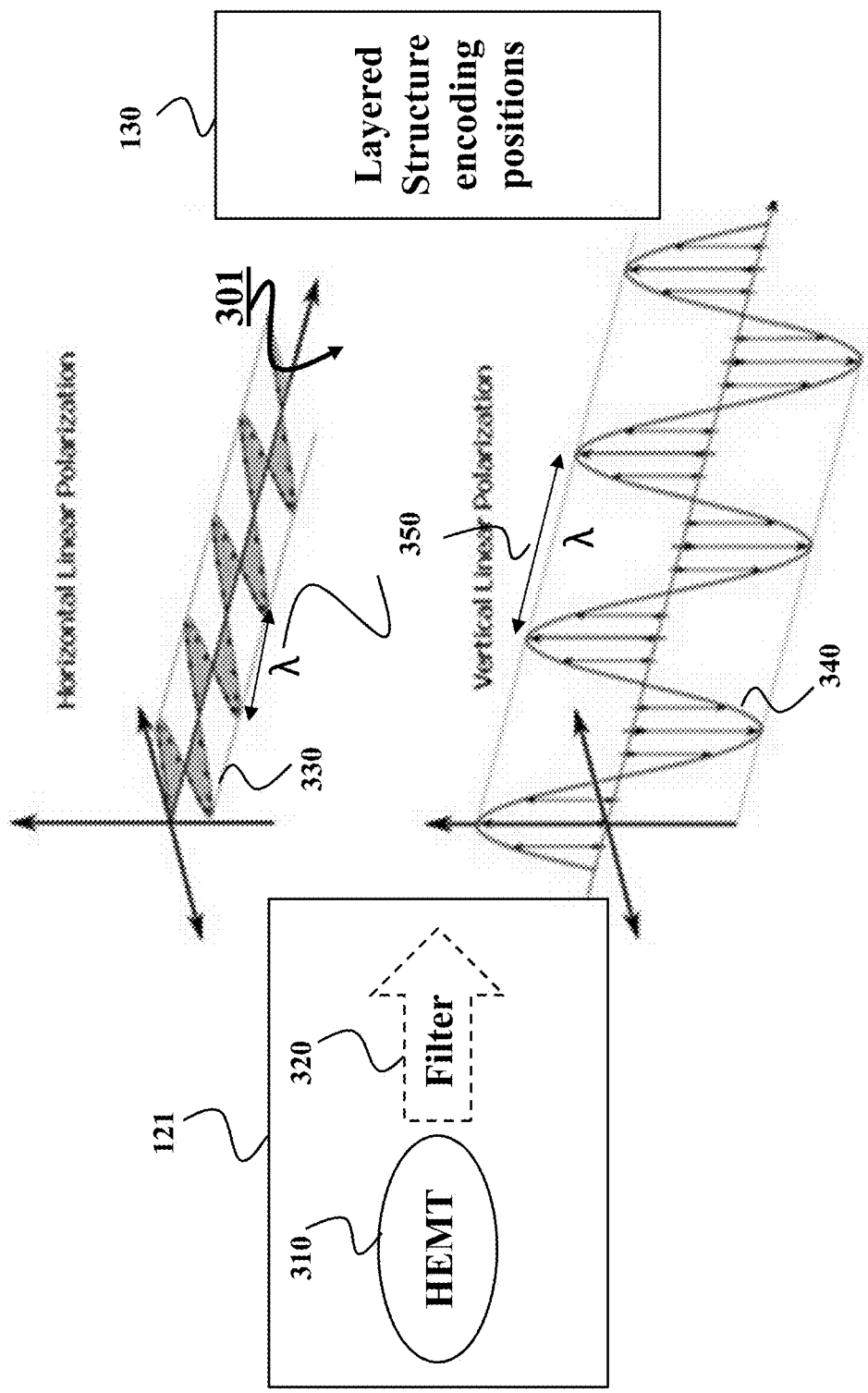
FIG. 3A shows a schematic of an emitter configured to emit transverse waves in accordance with some embodiments.

FIG. 3A shows a schematic of an emitter 121 configured to emit transverse wave 310 polarized to oscillate along a direction of polarization toward the layered structure 130 in accordance with some embodiments. The transverse wave 310 is a moving wave including oscillations occurring perpendicular to the direction of energy transfer and/or the propagation of the wave. Light is an example of a transverse wave.

Polarization is a property of the transverse waves that specifies the geometrical orientation of the oscillations. In a transverse wave, the direction of the oscillation is transverse to the direction of motion of the wave, so the oscillations can have different directions perpendicular to the wave direction. For example, the emitter 121 can emit a "horizontally polarized" electromagnetic wave 330 of wavelength $\lambda$ 350 that has its electric field vector E oscillating in the vertical direction in FIG. 3A. Alternatively, the emitter 121 can emit a "vertically polarized" electromagnetic wave 340 of wavelength $\lambda$ 350 that has its electric field vector E oscillating in the horizontal direction in FIG. 3A. In this disclosure, the direction of polarization and the direction of dominant electromagnetic component, e.g., the electric field, are used interchangeably.

The emitter 121 can use various kind of oscillators 125 to produce polarized wave 330 or 340. For example, the emitter can use an electronic oscillator having an electronic circuit that produces a periodic, oscillating electronic signal. For example, the electronic oscillator can use RC oscillator circuit, LC oscillator circuit, and/or crystal oscillator circuit to produce the oscillating wave of specific polarization. The emitter 121 can optionally use a polarization filter 320 to enforce the polarization of the transverse wave.

The absorption or reflection of the wave 301 by the layered structure 301 depends, among other things, on a resonant frequency of the incident waveform 330 or 340 defined by the wavelength $\lambda$ 350. In some implementations, the resonant frequency is in a terahertz (THz) spectrum placing the wavelength $\lambda$ 350 in up to millimeter range. To that end, in those embodiments, the oscillator 125 is a high frequency oscillator. Example of such a high-frequency oscillator is the one using high-electron-mobility transistor (HEMT) 310 used by one embodiment. However, other embodiments use different kinds of high-frequency oscillators.

FIG. 3B shows a block diagram of a receiver to measure amplitudes of the waveform reflected from the layered structure according to some embodiments. The reflected signal received by the antenna 123 is filtered with a filter 360 passing through the frequencies of the polarized signal emitted by the emitter 121. The filter analog signal 365 is directly submitted to the position information system 110 or optionally converted into a digital representation 375 by an analog-to-digital converter (ADC) 370.

FIGS. 4A and 4B show schematics illustrating properties of a polarized signal used by some embodiments to encode the positions. For example, a wire grating film 401 respond differently to different polarizations of a polarized signal. The wire grating film 401 can be implemented as a layer of metal wires 403 arranged in parallel on a substrate 402. In this example, the incident waveforms 410 propagate toward the wire grating film. FIG. 4A shows a top view of the wire grating film 401 and the wave 410 propagates in a direction perpendicular to the sheet of FIG. 4A. FIG. 4B shows a side view of the wire grating film 401 and the wave 410 propagates in a direction parallel to the sheet of FIG. 4B.

Some embodiments are based on recognition that the incident waveform 410 oscillating 420 in parallel with the wires generate electron movement along the wires in response to the oscillating field. The electron movement creates a travelling wave cancelling the incoming waves oscillating parallel to the wires and reflects it in the same manner as a thin metal sheet. The components of the incoming wave having a polarization parallel to the wires are thus reflected with some loss due to Joule heating caused by electron movement in the wires. For waves with electric fields perpendicular 430 to the wires, the electrons cannot move very far across the width of each wire. Therefore, little energy is reflected and the incident waveform is able to pass through the grid. In this case, the wire grating film behaves like a dielectric material.

To that end, the wire grating film 401 can work as a polarizer reflecting or passing through incident waveforms based on mutual orientation between the oscillation of the waves and the wires. However, the objects behind the polarizer, including substrate to support the polarizer, can cause additional reflection back to the receiver of the encoder, which introduces noises to the sensing system. Therefore, there is a need to design a polarizer that is mechanically stable and less susceptible to noises due to reflection from external objects.

Some embodiments are based on understanding that one of the cause of the drawbacks of the wire grating film polarizers is in the principles of their default operations letting the incident waveforms to pass through. Specifically, the wire grating film polarizers pass through all incident waveforms unless something is done to reflect the waves. For example, the wire grating film polarizer passes through the incident waveforms unless the grating is rotated to reflect the waveforms. In such a manner, the positioned is encoded in reflection of the signal making such a polarizer vulnerable to undesirable and uncontrolled reflections corrupting the reflected signal.

Some embodiments are based on realization that it is possible to reverse the principles of operations of the polarizers. Specifically, it is possible to design such a polarizer that reflects all incident waveforms unless something is done to absorb the waves. In such a manner, the position of the emitter is encoded in the controlled reflection and the absorption of the signal, reducing dependency on the incidental reflection. In addition, the principle of default reflection can help to achieve mechanical stability of the polarizer.

To that end, some embodiments use a layered structure including a metal plate, a dielectric layer arranged on the metal plate, and a plurality of metallic components arranged on the dielectric layer to form a plurality of resonant circuits enabling such a polarizer.

Figures 5A, 5B:
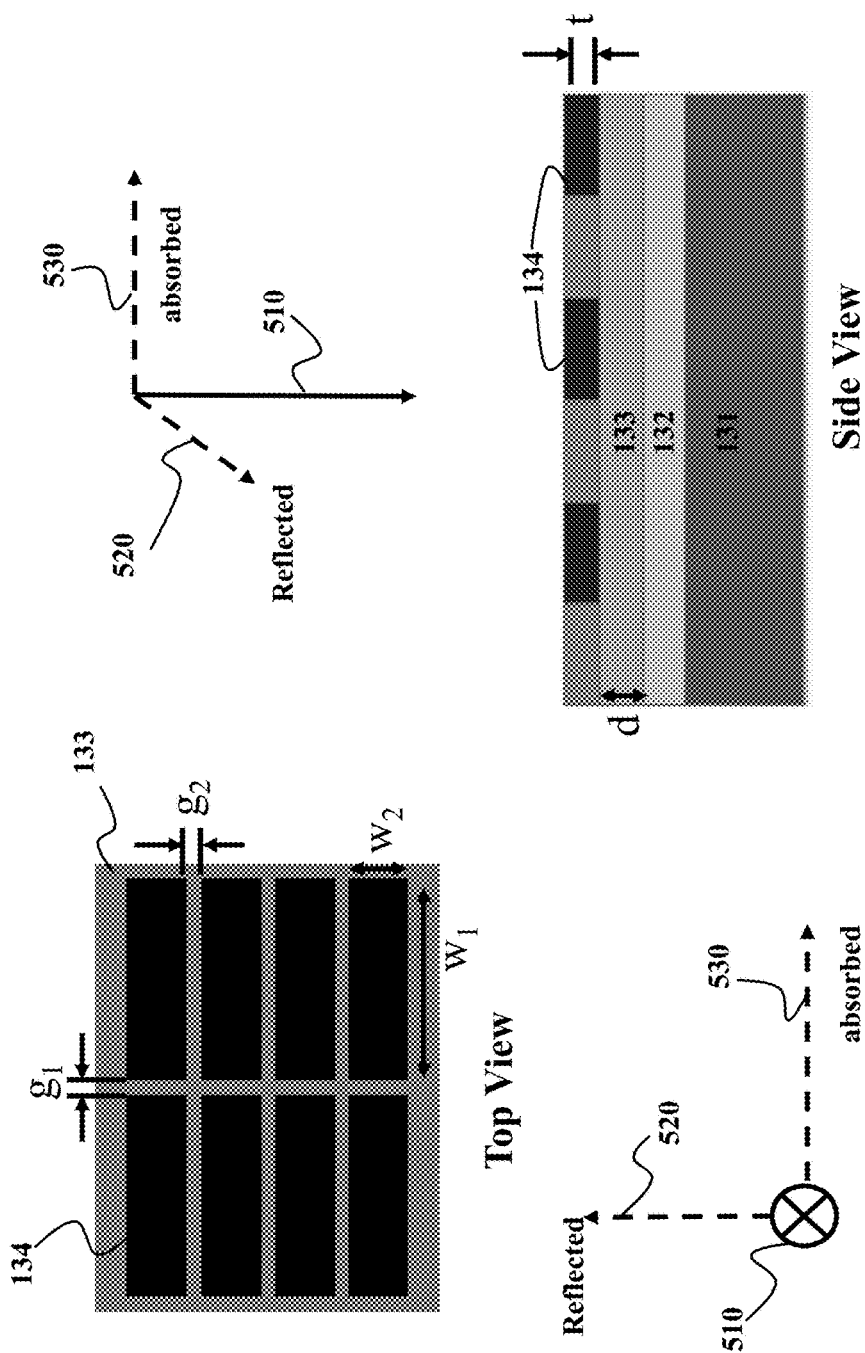
FIGS. 5A and 5B show schematics illustrating properties of the layered structure used by some embodiments to encode the positions.

FIGS. 5A and 5B show schematics illustrating properties of the layered structure used by some embodiments to encode the positions by reflecting and/or absorbing the polarized wave. FIG. 5A shows a top view of the layered structure with visible set of metallic components 134 partially occluding the top dielectric layer 133. In this example, the set of metallic components are arranged in a periodic pattern of rectangular-shaped metallic patches, with side lengths $w_1$ and $w_2$ and separation between neighboring patches $g_1$ and $g_2$. The thickness of the metallic patches is t, and the dielectric layer thickness is d.

In this example, for an incident waveform 410 that has a direction of polarization with electric field in parallel to the long side of the metallic patches, $w_1 > w_2$, the incident electric field generates electron movement oscillating along the direction of the electric field. Since there are gaps between the patches, the oscillation of electrons, or electric charges, are constrained by the physical length of the patch $w_1$. Across the small separation d between the top metal layer and the bottom metal plane, image charges of opposite signs appear on the bottom ground plane. The electron charge accumulation has a capacitive response to the incident waveform.

If the geometrical parameters of the metallic components are properly selected, the resonant circuits 155 is excited at the layered structure that absorbs the incident waveform 510 oscillating with the resonant frequency in the direction 530. If, due the orientations and/or dimensions of the metallic components the resonant circuits along the direction of oscillation 520 is not excited, the incident waveform 510 with the electric filed 520 is reflected from the metallic plate 132.

To that end, some embodiments design geometrical parameters of the metallic components as functions of the resonant frequency. In such a manner, a metallic component can form an inductor with inductance governed by the resonant frequency to excite the resonant circuit 155. Similarly, at least two metallic components positioned at a distance to each other can form a capacitor with capacitance governed by the resonant frequency to excite the resonant circuit 155.

Figures 5C, 5D:
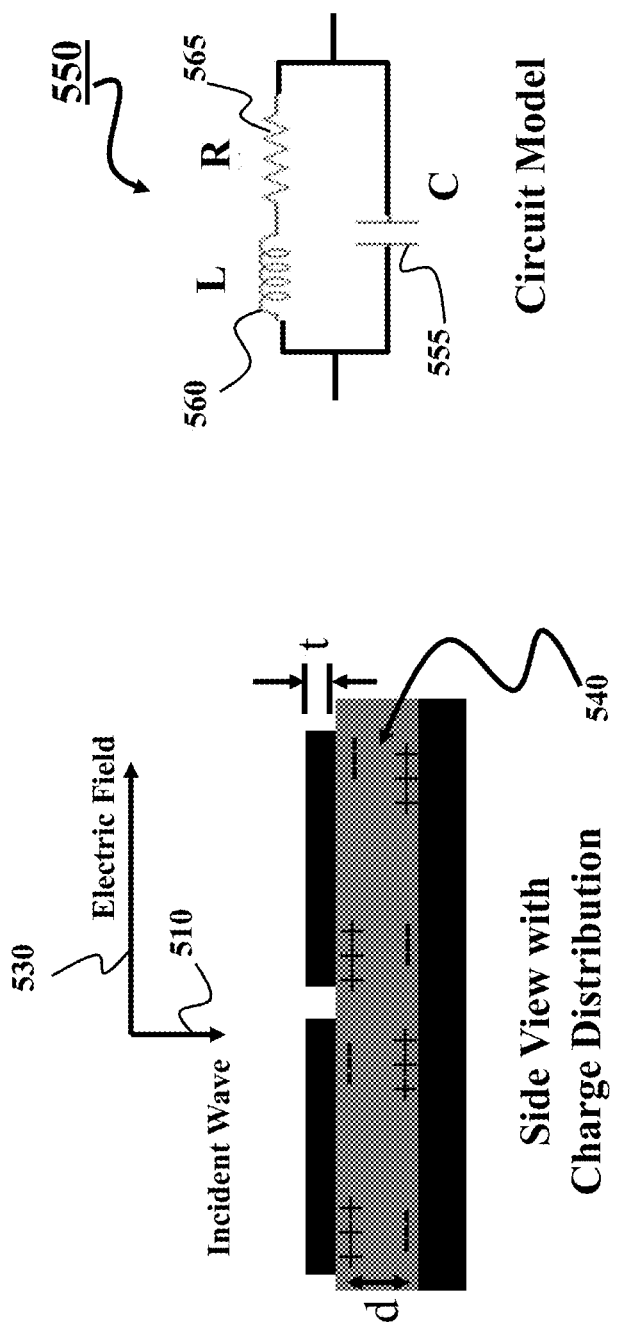
FIG. 5C shows a charge distribution excited in response to receiving incident waveform with polarization transmitted according to some embodiments.
FIG. 5D shows schematic of a circuit model describing physical behaviors of the charge distribution of FIG. 5C.

FIG. 5C shows a charge distribution 540 excited in response to receiving incident waveform 510 with polarization 530 transmitted according to some embodiments. Effectively, electric currents flow due to the oscillating electron charges. As a result, the system also has an inductive response to the incident waveform.

FIG. 5D shows schematic of a circuit model 550 describing physical behaviors of the charge distribution 540 of FIG. 5C. In the model, the inductance L 560 is created by the electric currents that are oscillating in the metallic match 134 and the bottom metal plane 132. The capacitance C 555 is due to the electron charge accumulation induced by the incident electric field, and the resistance R 565 is determined by the finite conductance of the metallic materials, and contributes to the absorption due to Ohmic losses.

All the effective circuit components are determined by the geometrical design and material properties of the metallic materials for the top metal plane and bottom metal plane, as well as the dielectric material properties of the dielectric layer between the two metal layers. The resonant frequency of the circuit is determined by $f = 1/2\pi\sqrt{LC}$. At resonance, the charge accumulation and electric current oscillation get much stronger; as a result, the energy absorption due to heat generation is also more efficient. Two components can contribute to the overall absorption, one is the Ohmic loss in the metallic materials, one is the dielectric loss in the lossy dielectric material that is between the two metallic layers. The overall absorption can reach a very high ratio that almost all the incident energy at the resonant frequency can be absorbed by the system.

There are many different ways to design such absorbers. For example, some embodiments create metallic patterns reflecting a desired barcode and adjust the dielectric layer materials and thicknesses so that the effective inductance L and effective capacitance C can be tuned, and a resonant mode can be excited at the operating resonant frequency resulting in the absorption of the incident waveform.

FIGS. 6A and 6B show a schematic of examples of encoding the position using metallic components of the layered structure according some embodiments. FIG. 6A is a cross-section A-A' of the top view of the layered structure of FIG. 6B.

A portion of the layered structure occupied by a metallic component form a resonant circuit that absorbs at least a portion of the waveform in dependence on difference between the resonant frequencies of the resonant circuit and the incident waveform and an orientation of the metallic component with respect to the direction of the polarization of the waveform. In contrast, a portion of the layered structure free from the metallic component reflects 640 the polarized waveform from the metallic plate 132.

For example, when the geometrical parameters of the metallic component 610 are selected to form the resonant circuit having the resonant frequency of the waveform, and when the orientation of the metallic component 610 is aligned with the direction of the polarization of the waveform, the resonant circuit formed by such a metallic component absorbs 615 the incident waveform the strongest.

When the orientation of the metallic component 620 is misaligned with the direction of the polarization of the waveform, the absorption 625 of the incident waveform by the resonant circuit formed by the metallic component 620 is weaker than the absorption 615. For example, when the incident waveform has an electric field that is perpendicular to the long side of a metallic component having a shape of the rectangular patch, or parallel to the short side of the rectangular patch, the same resonant mode cannot be excited at the same frequency due to the geometrical difference. The constraints to electron oscillation due to the external electric field are different, causing the effective capacitance C be different, as well as the effective inductance L.

A resonant mode may be excited at a different frequency than the operating frequency. As a result, low absorption is expected; and most of the energy is reflected. For example, when the geometrical properties of the metallic component 630 are selected to form the resonant circuit having the resonant frequency different from the resonant frequency of the waveform, the absorption 635 of the incident waveform by the resonant circuit formed by the metallic component 630 is weaker than the absorption 615.

In such a manner, the set of metallic components can provide codes for encoding the position of the emitter in a form of a pattern of the resonant circuits. The encoding is reflected in data indicative of one or combination of positions of the resonant circuits with respect to each other, resonant frequencies of the resonant circuits with respect to the resonant frequency of the waveform, and orientations of resonant circuits with respect to the direction of the polarization of the waveform. The data is stored in the memory to form an encoding pattern used by the processor to determine the position.

Figure 6C:
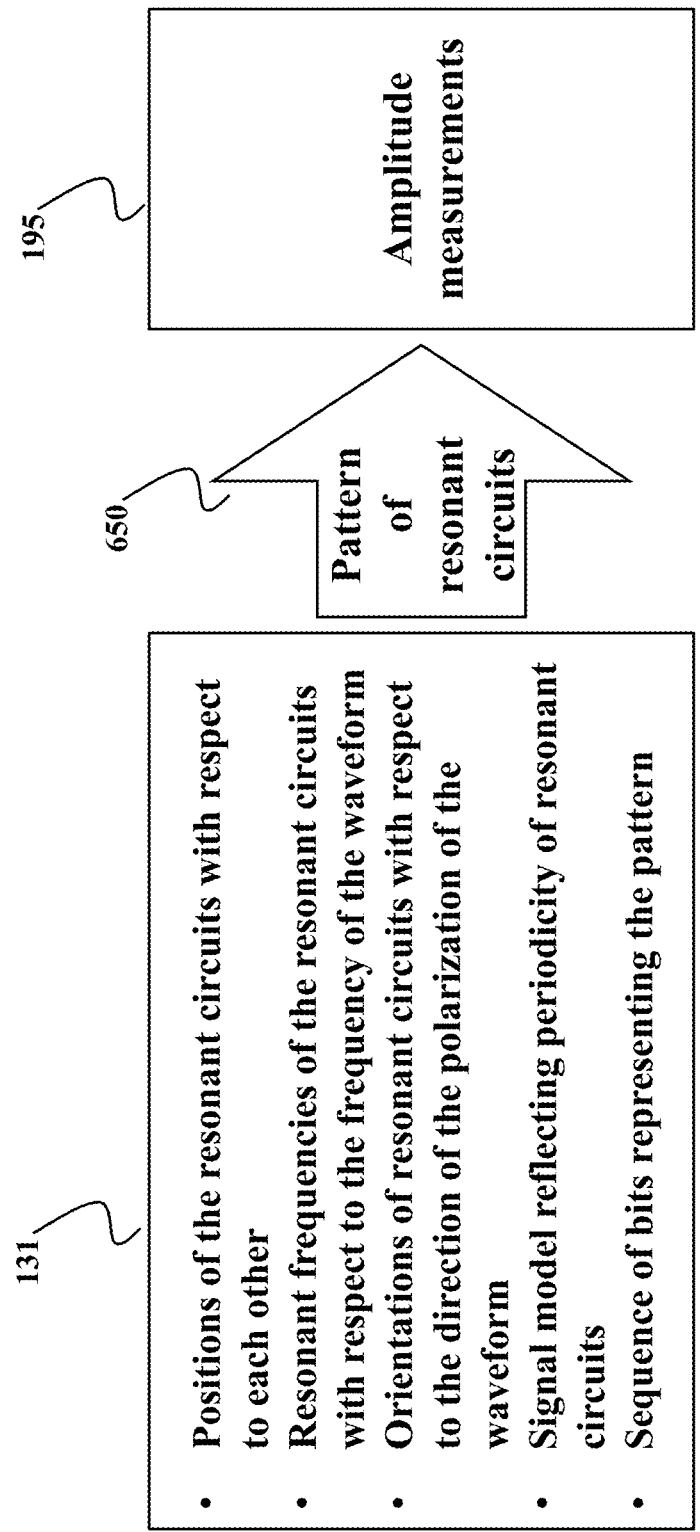
FIG. 6C shows a schematic illustrating the relationship between the data stored in the memory, the arrangement of the metallic components at the layered structure, and the measurements of the amplitudes of the reflected signal used by the processor to determine the position according to some embodiments.

FIG. 6C shows a schematic illustrating the relationship between the data stored in the memory, the arrangement of the metallic components at the layered structure, and the measurements of the amplitudes of the reflected signal used by the processor to determine the position according to some embodiments. The data 131 stored in the memory 108 relate positions of the emitter with amplitudes of the reflected waveform based on the pattern 650 of the resonant circuits formed by the layered structure. In some embodiments, the data indicate one or combination of positions of the resonant circuits with respect to each other, resonant frequencies of the resonant circuits with respect to the frequency of the waveform, and orientations of resonant circuits with respect to the direction of the polarization of the waveform. Examples of the data 131 also include a signal model of the reflected signal designed based on the pattern of the resonant circuits and a code including a sequence of bits representing the pattern of the resonant circuits.

In such a manner, the data define the pattern 650 of the resonant circuits effecting the amplitudes of the reflected waveform. The pattern 650 provides the code for encoding the position. Thus, knowing the measurements 195 and the data 131, the portion of the pattern 650 can be recovered.

Figure 7:
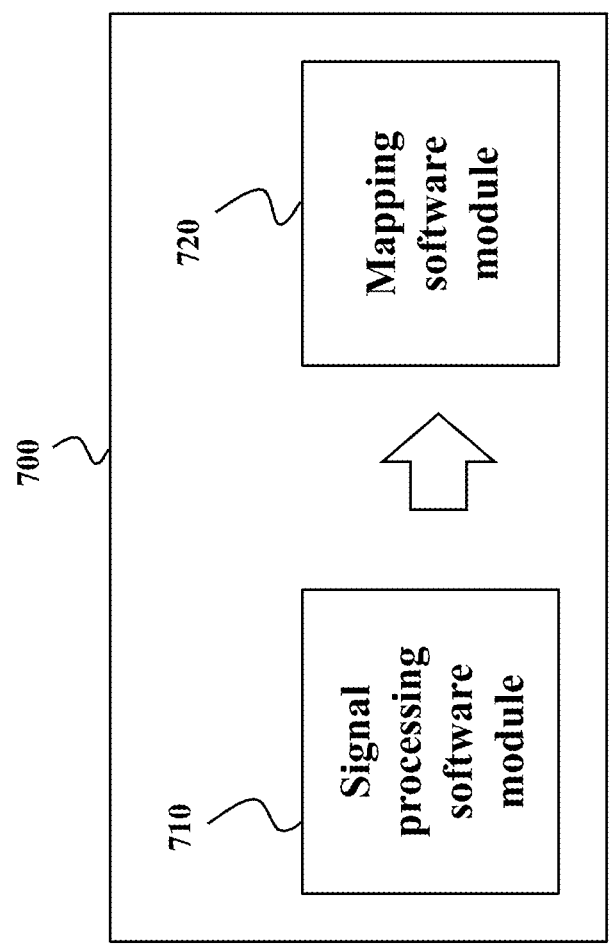
FIG. 7 shows an exemplar schematic of a non-transitory computer readable medium embodied thereon a program executable by a processor for performing position estimation according to different embodiments.

FIG. 7 shows an exemplar schematic of a non-transitory computer readable medium 700 embodied thereon a program executable by a processor for performing position estimation according to different embodiments. In this example, the program is organized in a number of software modules for executing different functions of the position information system 110.

For example, the signal processing software 710 is responsible for preparing the received signal indicative of measurements of amplitudes of the waveform reflected from the layered structure. For example, the signal processing software 710 can remove noise from the signal as well as normalize, sample, threshold, and/or modulate the signal. The mapping module 720 receives the processed signal and maps the processed signal to the position of the encoder.

Figure 8A:
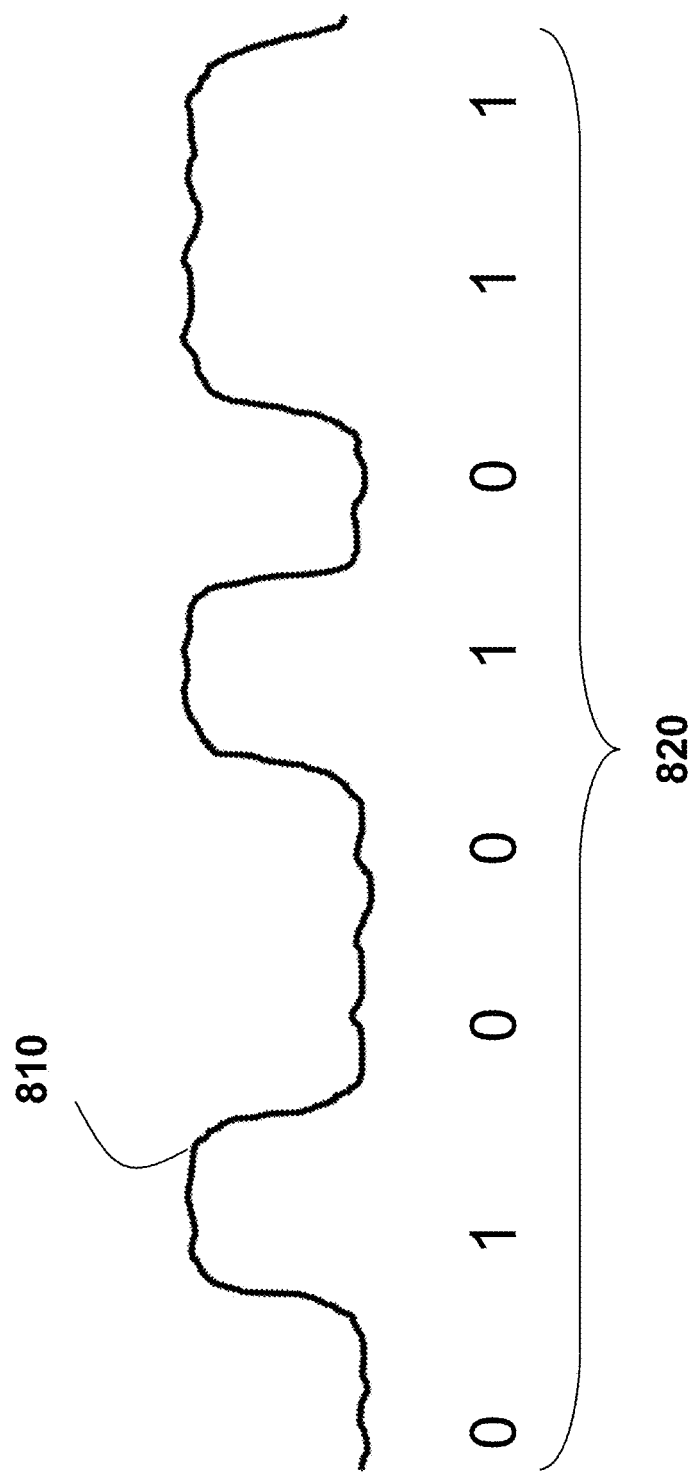
FIGS. 8A and 8B show schematics of performance of modules of FIG. 7 according to some embodiments.
Figure 8B:
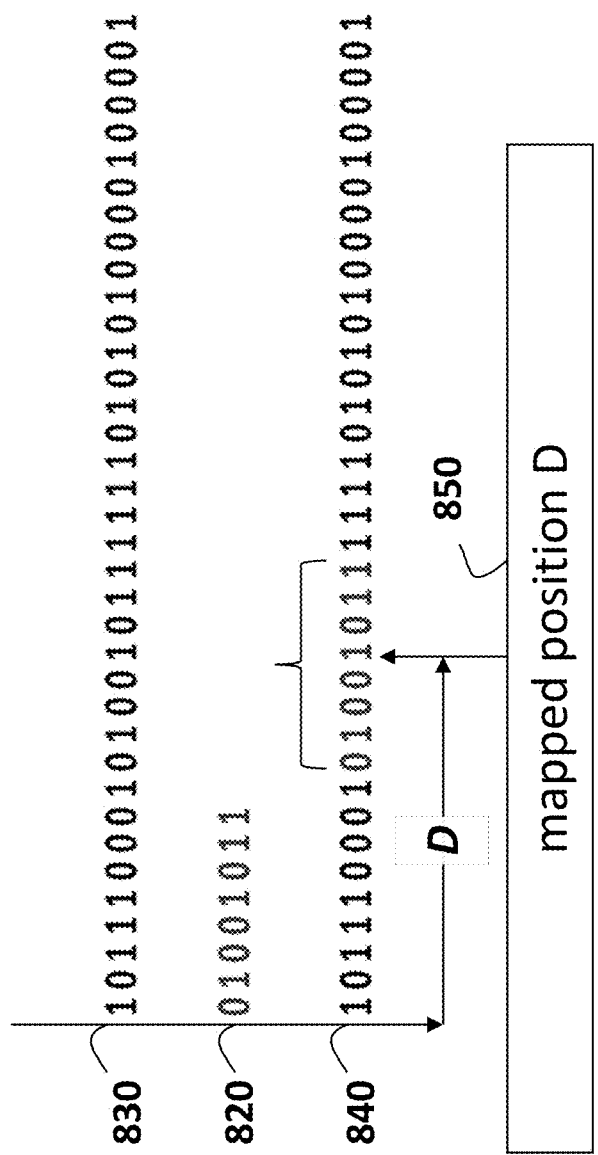

FIGS. 8A and 8B show schematics of performance of modules of FIG. 7 according to some embodiments. For example, FIG. 8A shows an illustration of the signal 810 indicative of the measurements of amplitudes of the waveform, and a corresponding decoded sequence 820. In this example, the decoded sequence 820 is a part of de Bruijn sequence encoding the position. A look-up table of length 2n can be used to determine the position decoded sequence within the entire de Bruijn sequence. For example, FIG. 8B shows the code 830, which is de Bruijn sequence encoding the position, and the result 840 of matching the decoded sequence 820 with the portion of the de Bruijn sequence 830 to produce the position 850.

Figure 9A:
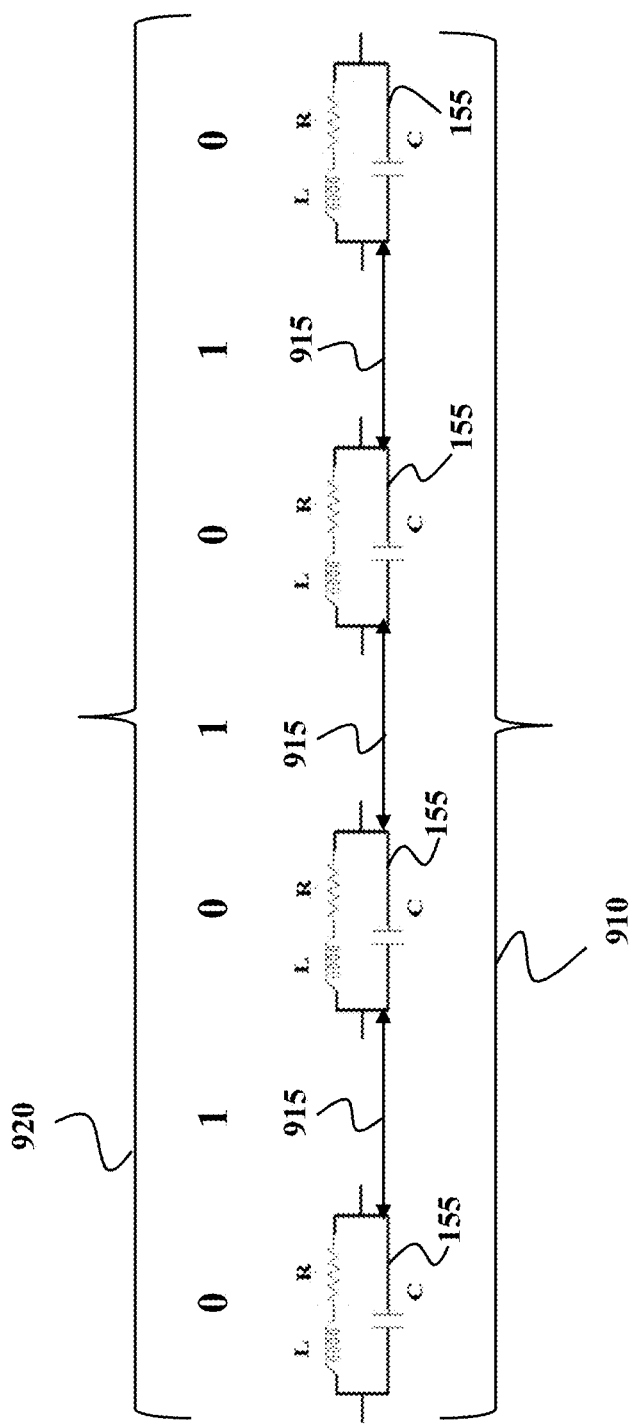
FIG. 9A shows an example of a pattern of resonant circuits formed by the layered structure according to one embodiment.

FIG. 9A shows an example of a pattern of resonant circuits formed by the layered structure according to one embodiment. In this embodiment, the metallic components are arranged on the dielectric layer to form a periodic pattern 910 of resonant circuits 155 with identical characteristics separated from each other with a constant distance 910. The pattern 910 corresponds to a binary code 920 interchanging values of zeros and ones. Such a pattern is simpler to implement and used by some embodiments to encode a relative position of the emitter.

In different embodiments, the data stored in the memory stores different indication of the periodicity of the pattern 910. For example, in one embodiment the data 131 include a signal model of the waveform reflected from the layered structure forming the periodic pattern of resonant circuits with the identical characteristics. In this embodiment, the processor determines the position from the measurements of the amplitudes based on the signal model.

Figure 9B:
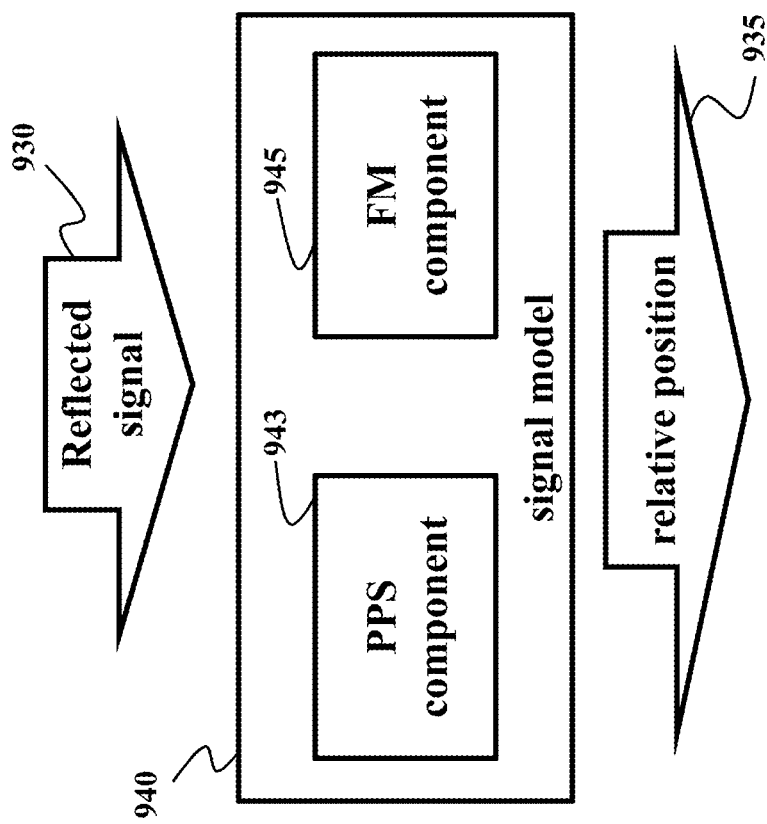
FIG. 9B shows a schematic of an exemplar signal model used by one embodiment.

FIG. 9B shows a schematic of an exemplar signal model used by one embodiment. In this embodiment, the signal model 940 includes two components describing relationship between the reflected signal 930 and the position 935. Specifically, this embodiment is based on recognition that the relative position 935 of the emitter can be inferred from the change in the phase of the reflected signal 930 according to a signal model 940 having one or combination of a polynomial phase signal (PPS) component 943 and a frequency modulated (FM) component 945. PPS component of the model has a polynomial structure due to relative motion between the emitter and the layered structure. The FM component affects the phase of the reflected signal in a periodic manner due to vibration of the emitter during its motion.

Generally, the reflected signals from the spatially periodic structure can be written as $$x(d) = Ae^{j2\pi\left[\frac{d}{h} + \sum_{m=1}^{M} b_m \sin\left(\frac{2\pi md}{h} + \phi_m\right) + \psi_0\right]}, \quad (1)$$

where A is the unknown amplitude, d is the axial position index of the moving readhead, $b_m > 0$ and $\phi_m$ are the modulation index and, respectively, the initial phase of the m-th sinusoidal FM component, M is the number of sinusoidal FM components in the phase, and $\psi_0$ is the initial phase. The first phase term is due to the phase change proportional to the inter-reflector spacing of h. Therefore, the moving distance and speed of the moving encoder can be inferred from the change in the first phase term. Meanwhile, the second term is, induced by the spatially periodic absorbers and/or reflectors, the motion-related sinusoidal FM component. From (1), we have x(d)=x(d+lh), where l is an integer. That is the moving receiver sees exactly the same reflected waveforms at two axial positions which are at a distance of h apart from each other.

With a sampling interval of $\Delta T$ and assuming that the encoder moves at an initial velocity of $v_0$ and an acceleration of $\alpha$, one embodiment transforms the position index to the discrete-time index via $d=v_0t+at^2/2|_{t=n\Delta T}=v_0n\Delta T+a(n\Delta T)^2/2, n=n_0, \ldots, n_0+N-1$ with $n_0$ and N denoting the initial sampling index and the number of total samples, respectively. As a result, the discrete-time reflected signal is given as $$x(n) = \quad (2)$$
$$Ae^{j2\pi\left[\frac{v_0n\Delta T+a(n\Delta T)^2/2}{h}+\psi_0\right]} \times e^{j\sum_{m=1}^{M} 2\pi\left[b_m\sin\left(2\pi m\frac{v_0n\Delta T+a(n\Delta T)^2/2}{h}+\phi_m\right)\right]}.$$

For more dynamic motions of the encoder, higher-order phase terms may appear in the reflected signal. For instance, if the acceleration is time-varying, a third-order phase term (on $t^3$) may be required to model the reflected signal, i.e., $d=v_0t+at^2/2+gt^3/6$ where g denotes the acceleration rate. To generalize the coupled signal model, some embodiments use a coupled mixture of the PPS and sinusoidal FM signals:

$$x(n) = Ae^{j2\pi\left[\sum_{p=0}^{P} \frac{a_p n^p}{p!} + \sum_{m=1}^{M} b_m \sin(2\pi m f_0(a_1,\ldots,a_P)n+\phi_m)\right]}, \quad (3)$$

where the fundamental sinusoidal FM frequency $f_0$ is now coupled with the PPS phase parameters, $a_1, \ldots, a_P$. Depending on applications, the coupling function $f_0(a_1, \ldots, a_P)$ can be either nonlinear or linear with respect to $\{a_P\}_{p=1}^{P}$. In the case of linear encoders, it is a linear function as $f_0(a_1, \ldots, a_P) = c_0 \sum_{p=1}^{P} a_p n^{p-1}/p!$ with $c_0$ denoting a known scaling factor.

Figure 10A:
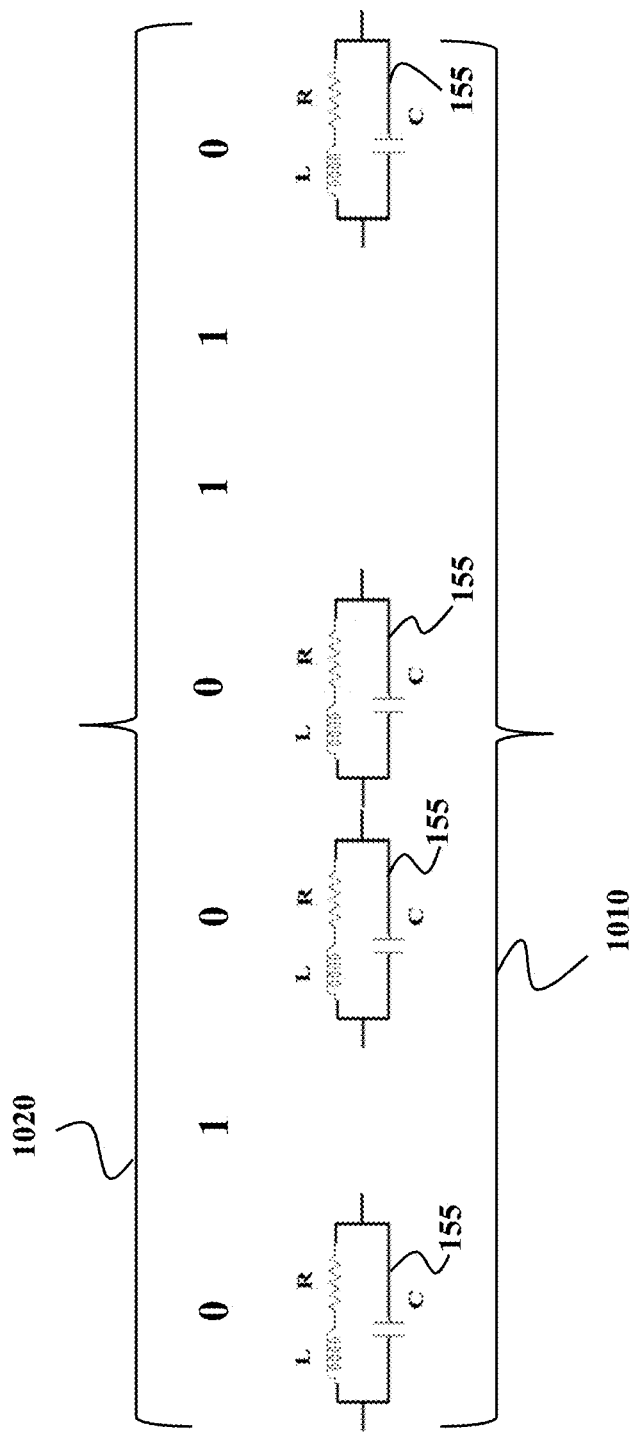
FIG. 10A shows an example of a pattern of resonant circuits formed by the layered structure according to one embodiment.

FIG. 10A shows an example of a pattern of resonant circuits formed by the layered structure according to one embodiment. In this embodiment, the metallic components are arranged on the dielectric layer to form a non-periodic pattern 1010 of resonant circuits with identical characteristics to encode an absolute position of the emitter. The code 1020 sored in the data include a mapping between sequences of amplitude values and the position of the emitter. The code and the mapping are functions of the non-periodic pattern of resonant circuits allowing the processor to map the measurements of the amplitudes to the position of the emitter according to the mapping.

FIG. 10B shows a lookup table providing a mapping between sequences of amplitude values of the reflected wave and the position of the emitter according to one embodiment. In this embodiment, the processor decodes the code 1031 from the measurements of the amplitudes of the reflected wave and maps the code 1031 to the position of the emitter 1032.

Figure 10C:
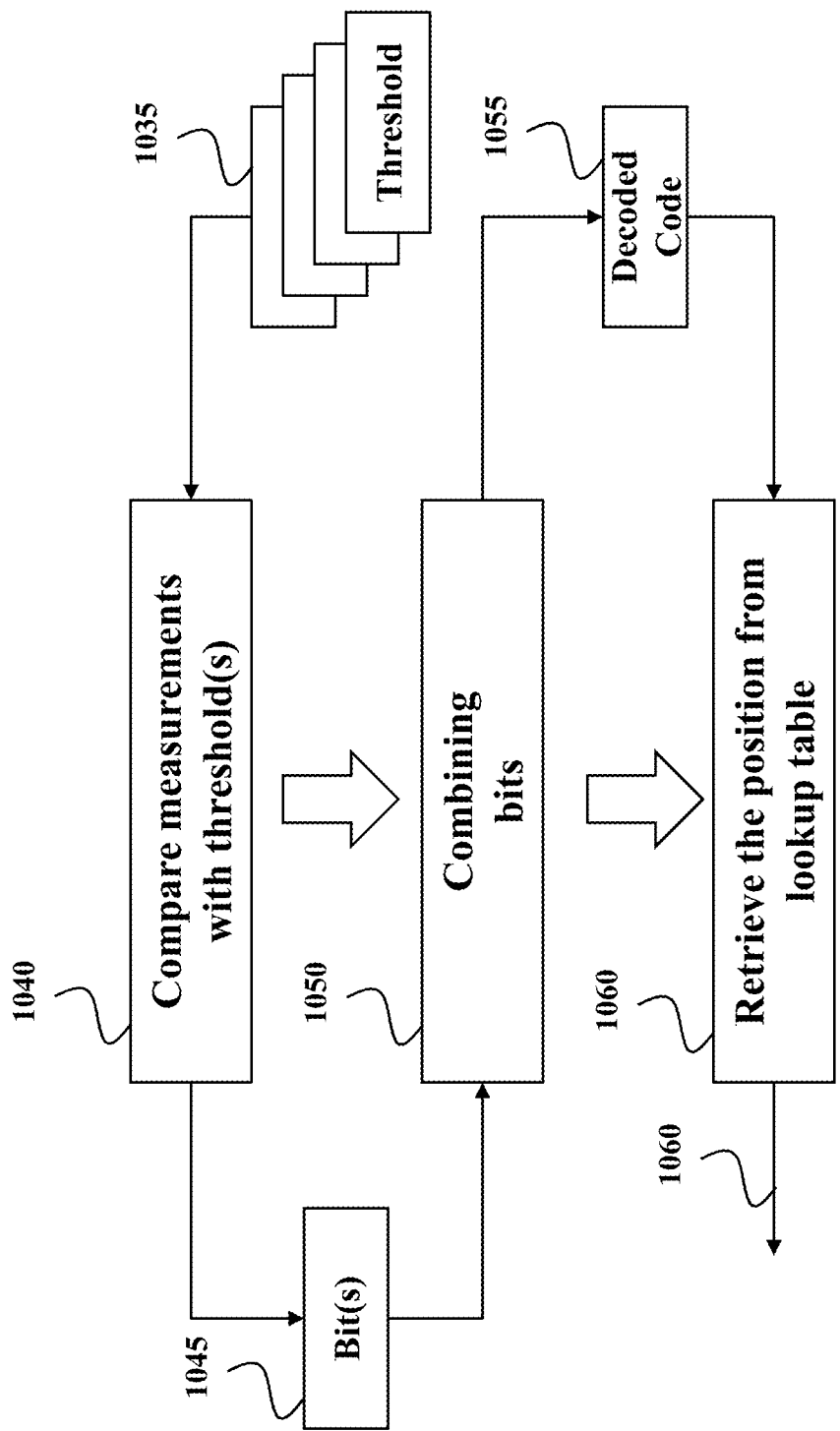
FIG. 10C shows a block diagram of a method for determining the position using the lookup table of FIG. 10B according to one embodiment.

FIG. 10C shows a block diagram of a method for determining the position using the lookup table of FIG. 10B according to one embodiment. The processor compares 1040 the amplitude measurements 195 with one or multiple thresholds 1035 to determine bits 1045 of the code. For example, one embodiment compares the measurements with a single threshold making the bit 1045 equals zero when the amplitude is less than threshold or equals one when the amplitude is greater than the threshold. This embodiment is less sensitive to noise of the reflected waveform. Additionally, or alternatively, one embodiment compares the measurements with multiple thresholds, such that one measurement produces multiple bits of code to increase the resolution of position encoding.

Next, the method combines the bits of multiple measurements to produce the decoded code 1055 and retrieves 1060 the position 1060 using the code 1055. For example, one embodiment performs the position estimation iteratively. The embodiment appends newly received bits to the code determined during previous iterations and removes the oldest bits from the beginning of the code to update the code while preserving its length.

Some embodiments are based on recognition that having a metallic component to encode the position can be inconvenient for high frequency encoder. In those embodiments, the position is encoded not by a single metallic component but by a group of the metallic components. For example, in some embodiments, a group of metallic components forms a unit cell encoding the position. The layered structure includes a plurality of unit cells, and the data stored in the memory include a code defined by one or combination of positions and orientations of the unit cells, i.e., by a pattern of resonant circuits formed by the unit cells. In such a manner, the unit cell forms one unit in a reflected signal analyzed by the processor.

Figure 11:
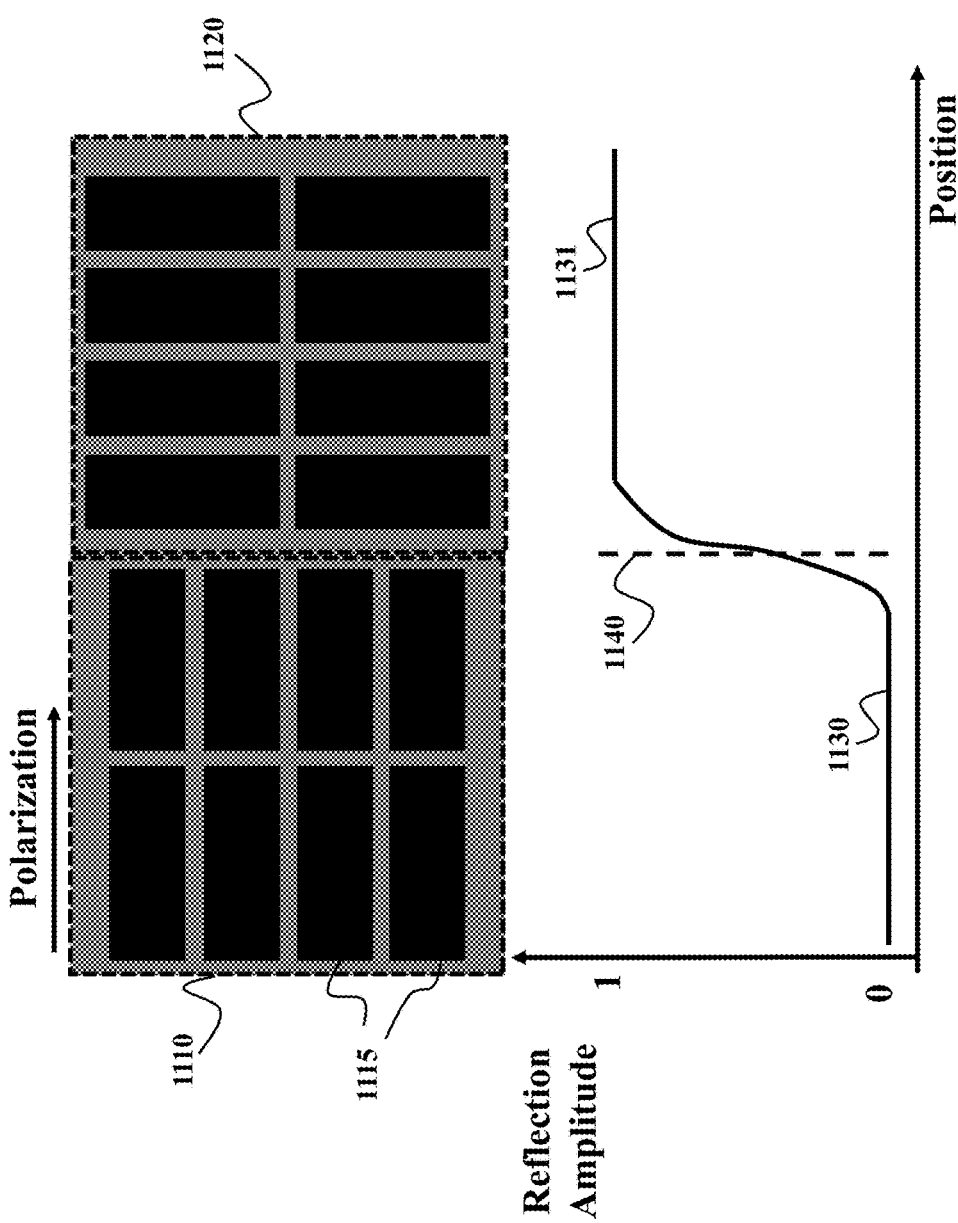
FIG. 11 shows a schematic of unit cells used by some embodiments to encode the position.

FIG. 11 shows a schematic of unit cells used by some embodiments to encode the position. In some implementations, the structures of the metallic components of the same unit cell are identical to give the same response to the incident waveform. For example, unit cells 1110 is formed using a group of six rectangular patches 1115. The geometrical parameters and arrangement of the metallic components 1115 forming the unit cell 1110 are functions of the resonant frequency, such that a metallic component of the unit cell forms an inductor with inductance governed by the resonant frequency, and at least two metallic components of the unit cell are positioned at a distance to each other to form a capacitor with capacitance governed by the resonant frequency. Therefore, the reflected signal amplitude is the same across the entire unit cell.

The unit cell 1120 has the same structure as the unit cell 1110, but different orientation with respect to the polarization of the incident waveform. The orientation of the unit cell 1110 is referred herein as an absorbing orientation. The unit cell with the absorbing orientation absorbs the incident polarized waveform resulting in low values of the amplitude of the reflected signal 1130. The orientation of the unit cell 1120 is referred herein as a reflecting orientation. A unit cell with the reflecting orientation reflects the incident polarized waveform resulting in higher values of the amplitude of the reflected signal 1131. Consider a case when two unit cells with structures/orientations respond to different polarizations meet. For the same incident waveform, each unit cells gives a distinct reflection amplitude resulting in sharp transition 1140 from one amplitude to another across the border of unit cells.

The orientation of the unit cell can be indicated by the orientation of the shape of the metallic components with respect to the polarization of the incident waveform. In this example, the electric field of the incident waveform is polarized along the horizontal axis. For example, in the unit cell 1110 with the absorbing orientation, the longest dimension of the metallic components 1115 forming the unit cell is aligned with the direction of polarization. In contrast, in the unit cell 1120 with the reflecting orientation, the longest dimension of the metallic components forming the unit cell is perpendicular to the direction of polarization The polarization-dependence of absorption of the layered structures can also be explored with rotations. While the reflection amplitude at angle 0° is 0 (absorption orientation), and the reflection amplitude at angle 90° is 1 (reflection orientation), the angles in between is a mix of the two modes. This is because the linear polarization can be decomposed into the two directions at 0° and 90°, with different weighting.

Figure 12:
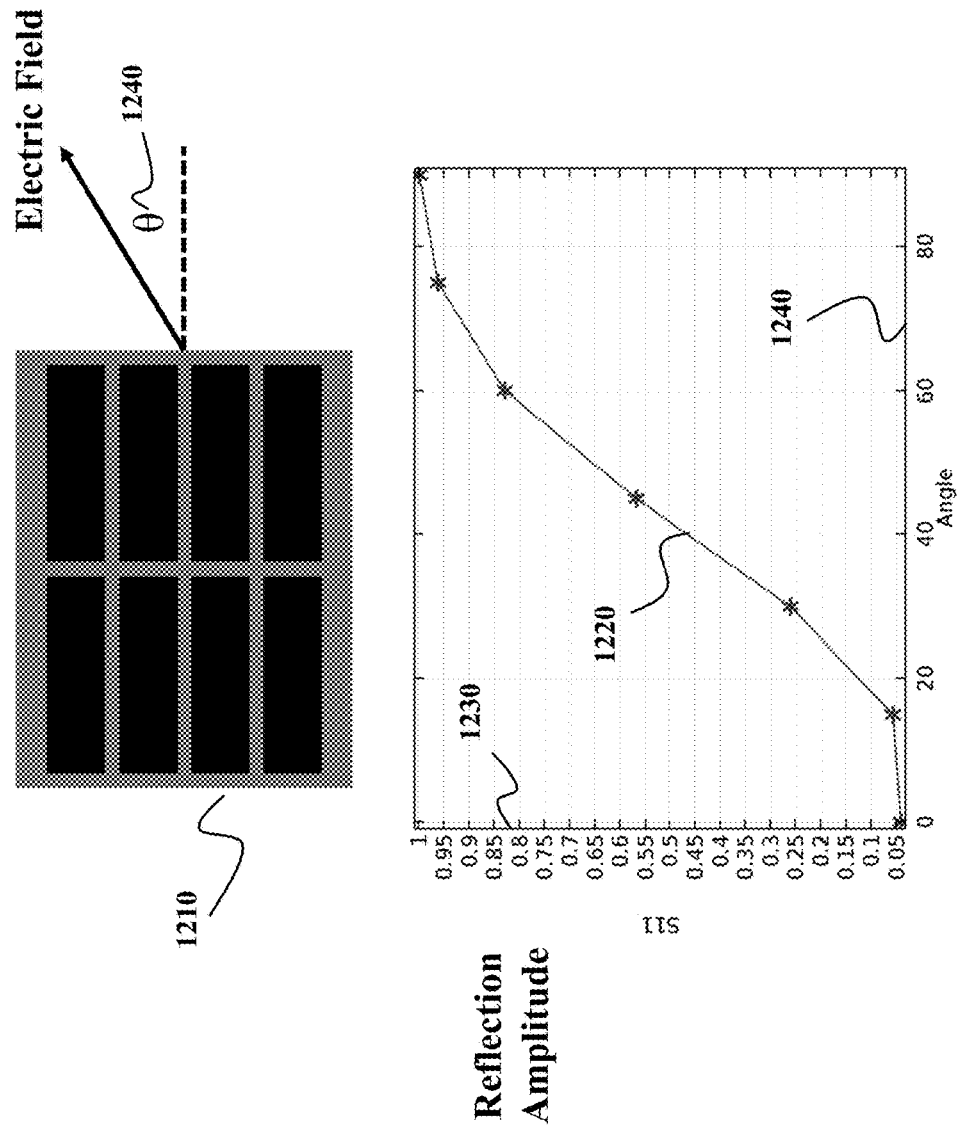
FIG. 12 shows a graph illustrating a change of amplitude of the reflected signal based on orientation of the unit cell used by some embodiments.

FIG. 12 shows a graph illustrating a change 1220 of amplitude 1230 of the reflected signal based on orientation 1240 of the unit cell 1210 used by some embodiments. As can be seen, from angle 0° to 90°, the reflection amplitude is increased gradually from a small value close to 0, to a very large value close to 1. The shape of the curve is a sinusoidal relation with the angle.

To that end, in some embodiments, at least some unit cells have intermediate orientations between the reflecting orientation and the absorbing orientations. Those embodiments allow increasing the resolution of the encoding pattern. Notably, in some embodiments, the unit cells, such as the unit cells 110, 1120, and 1210 have a squared outline formed by non-squared metallic components. Due to the square outline, those embodiments are better adaptable to the rotation of the unit cells.

Figure 13:
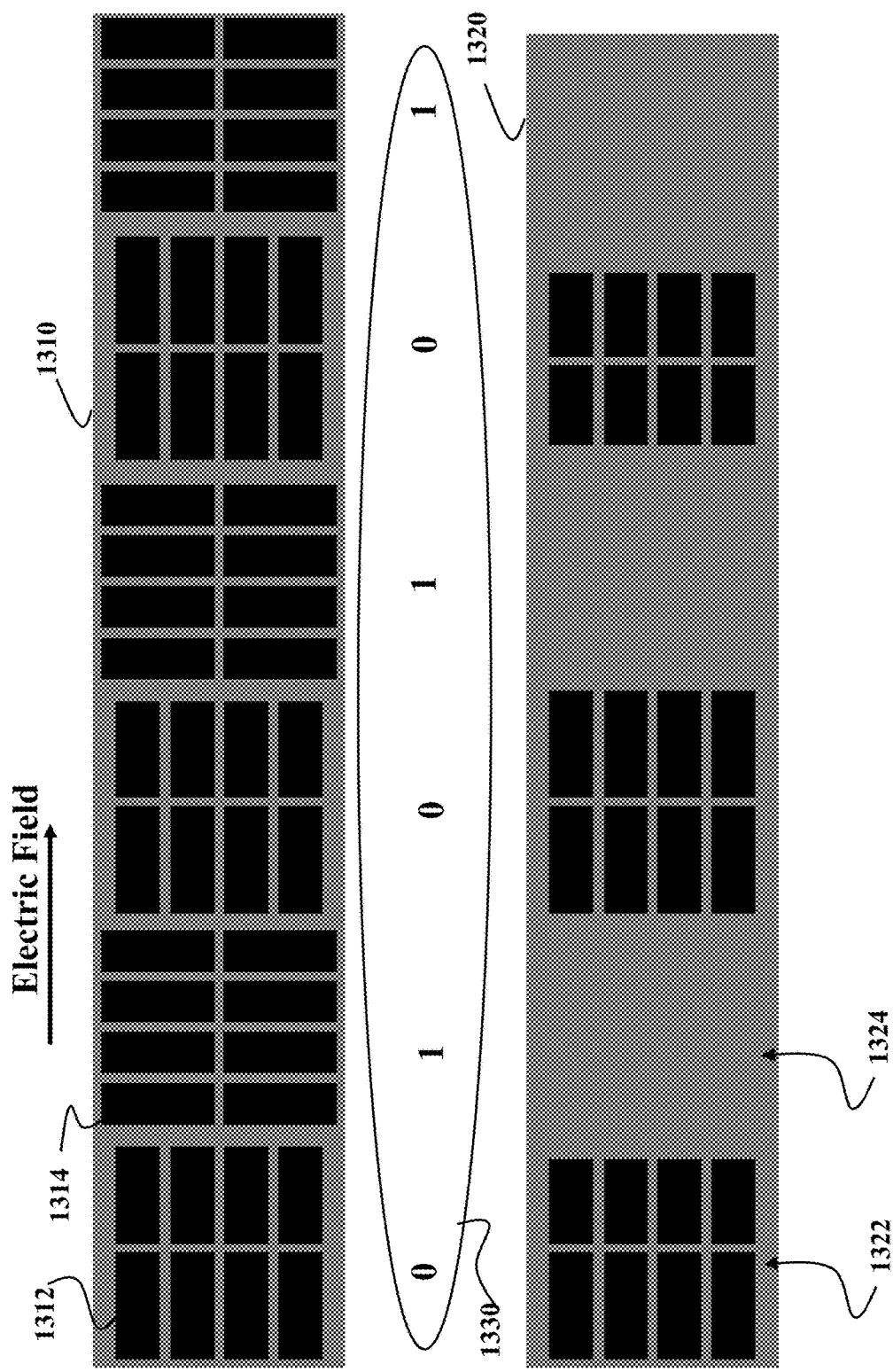
FIG. 13 shows schematics of different arrangements of the unit cells resulting in a similar pattern of resonant circuits according to some embodiments.

FIG. 13 shows schematics of different arrangements of the unit cells resulting in a similar pattern of resonant circuits according to some embodiments. In the arrangement 1320 the unit cells have the same orientation with respect to the polarization of the waveform. A portion 1322 of the layered structure occupied by the unit cell absorbs at least a portion of the waveform, while a portion 1324 of the layered structure free from the unit cell reflects the polarized waveform from the metallic plate. Such an arrangement results in the pattern of resonant circuits represented by the code 1330. This arrangement is cheaper to implement than the arrangement 1310 but the incident waveforms penetrate the layered structure in different depth introducing the noise caused by different delays of the reflection.

In the arrangement 1310, at least some unit cells have different orientations with respect to the polarization of the waveform. In this example, different orientations include a reflecting orientation and an absorbing orientation. A unit cell 1312 with the absorbing orientation absorbs the incident polarized waveform, while a unit cell 1314 with the reflecting orientation reflects the incident polarized waveform. Such an arrangement also results in the pattern of resonant circuits represented by the code 1330. This arrangement is more expensive to implement than the arrangement 1320 but the incident waveforms penetrate the layered structure at the same depth reducing the noise caused by different delays of the reflection.

Figure 14:
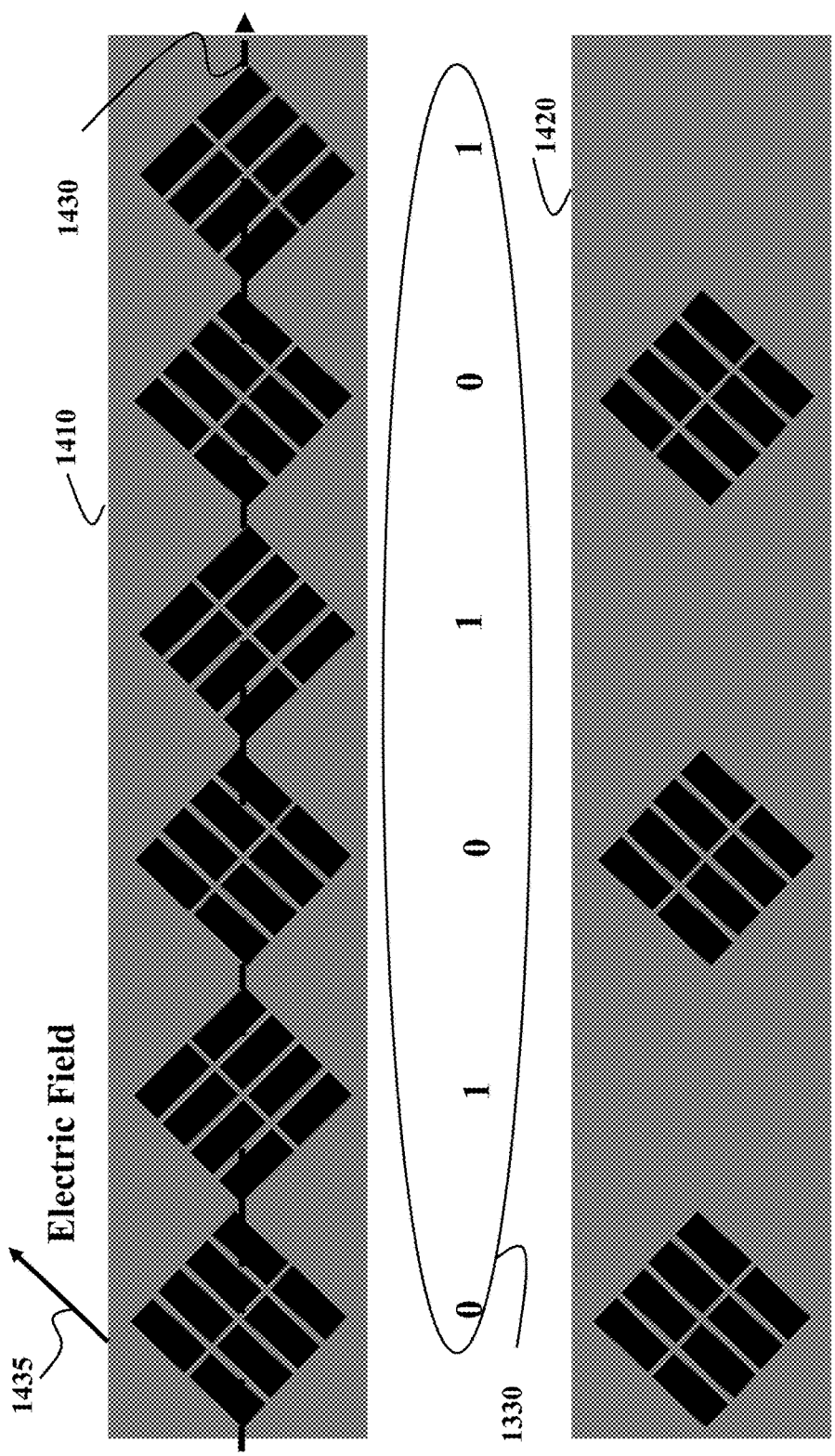
FIG. 14 shows schematics of different arrangements of the unit cells according to other embodiments resulting in a pattern of resonant circuits similar to the pattern of arrangement of FIG. 13.

FIG. 14 shows schematics of different arrangements of the unit cells according to other embodiments resulting in a pattern of resonant circuits similar to the pattern of arrangement of FIG. 13. In these arrangements 1410 and 1420, the polarization of electric field 1435 of the polarized signal is not aligned with the axis 1430 of the arrangement of the barcode.

In the embodiments of FIGS. 13 and 14, the position and the orientations of the unit cell defines one bit of the code. Specifically, the unit cell with absorbing orientation defines a bit of the code with value zero, and the unit cell with reflecting orientation defines a bit of the code with value one.

Figure 15:
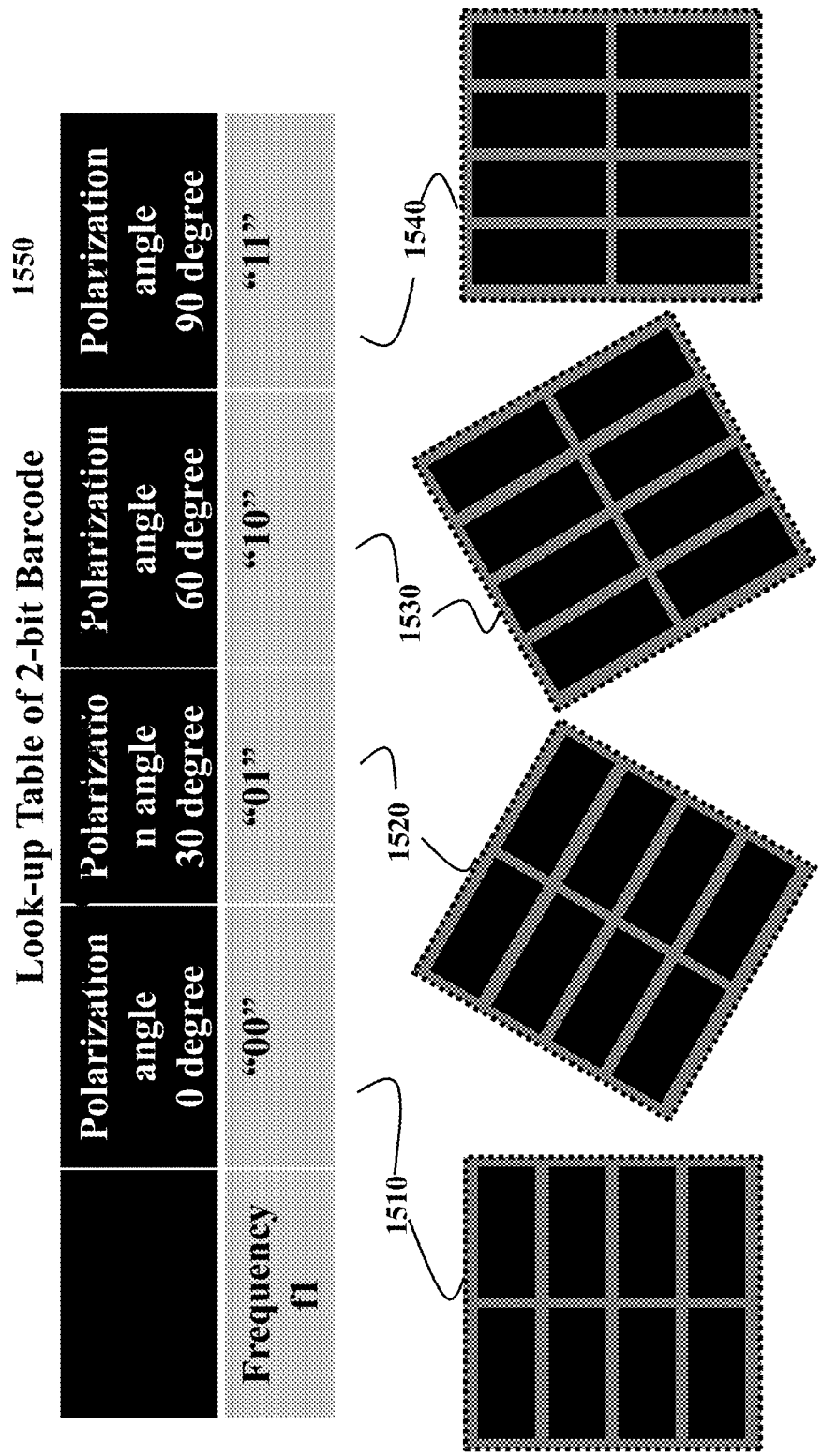
FIG. 15 show a schematic of an arrangement of unit cells according to some embodiments in which the position and the orientations of the unit cell defines two bits of the code.

FIG. 15 show a schematic of an arrangement of unit cells according to some embodiments in which the position and the orientations of the unit cell defines two bits of the code. In these embodiments, at least some unit cells have intermediate orientations between the reflecting orientation and the absorbing orientations. In such a manner, multi-bit quantization of the reflection can be applied to assign integer values to reflection amplitudes corresponding to polarization rotation angles between 0 and 90 degrees.

For example, a 2-bit barcode can be designed by assigning integer values that correspond to the reflection amplitude at polarization rotation angles 0 degrees 1510, 30 degrees 1520, 60 degrees 1530, and 90 degrees 1540. For example, a look-up table 1550 can associate the integer values with different polarization rotation angles.

In various embodiments, geometrical parameters and arrangement of the metallic components forming the unit cell are functions of the resonant frequency. In such a manner, a metallic component of the unit cell forms an inductor with inductance governed by the resonant frequency, and at least two metallic components of the unit cell are positioned at a distance to each other to form a capacitor with capacitance governed by the resonant frequency.

Figure 16:
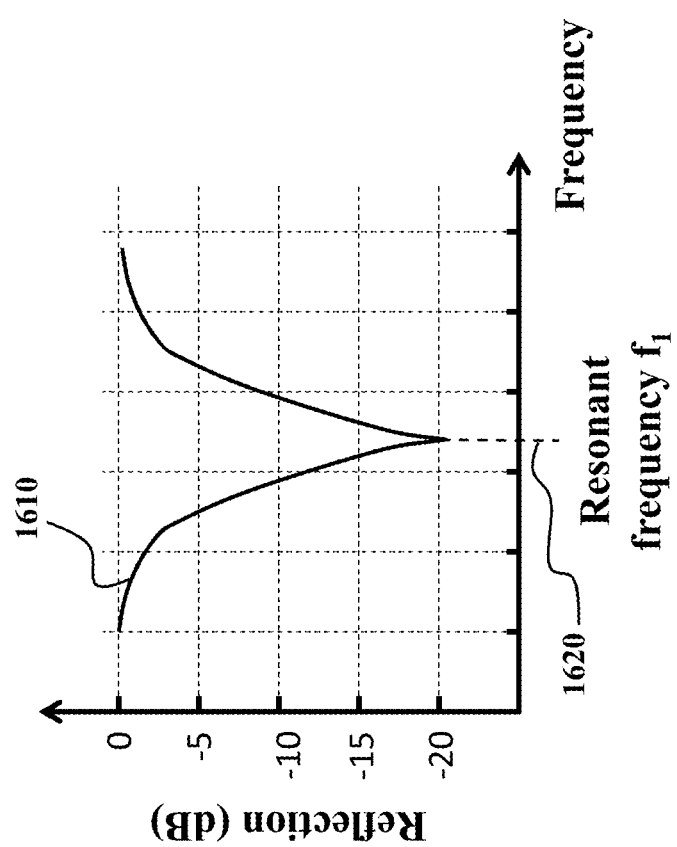
FIG. 16 shows an exemplar reflection spectrum when the incident waveform that excites the resonant circuit formed by the unit cell designed for the resonant frequency according to some embodiments.

FIG. 16 shows an exemplar reflection spectrum when the incident waveform that excites the resonant circuit formed by the unit cell designed for the resonant frequency 1620 according to some embodiments. However, alternative embodiments are based on recognition that multi-bit bar code can be designed using multiple frequencies of the incident polarized wave.

Figure 17A:
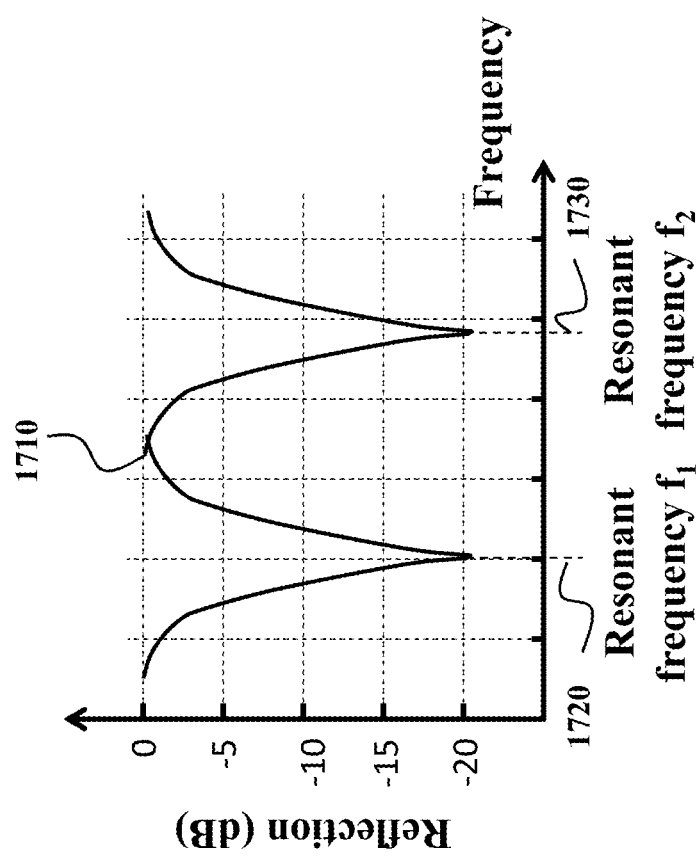
FIG. 17A shows an exemplar reflection spectrum when the incident waveform includes multiple resonant frequencies according to one embodiment.

FIG. 17A shows an exemplar reflection spectrum 1710 when the incident waveform includes multiple resonant frequencies according to one embodiment. In this embodiment, the waveform emitted by the emitter includes a first waveform with the first resonant frequency $f_1$ 1720 and a second waveform with the second resonant frequency $f_2$ 1730. Different barcodes can be designed by combining responses on two distinct resonant frequencies f1 and f2 respectively.

FIG. 17B shows a lookup table 1740 with codes designed by one embodiment for different frequencies of FIG. 17A. In this example, when both waveforms are absorbed, the code is 00. When the first waveform is absorbed but the second waveform is reflected, the code is 01. When the first waveform is reflected but the second waveform is absorbed, the code is 10. When the first waveform is reflected and the second waveform is reflected, the code is 11.

Figure 18:
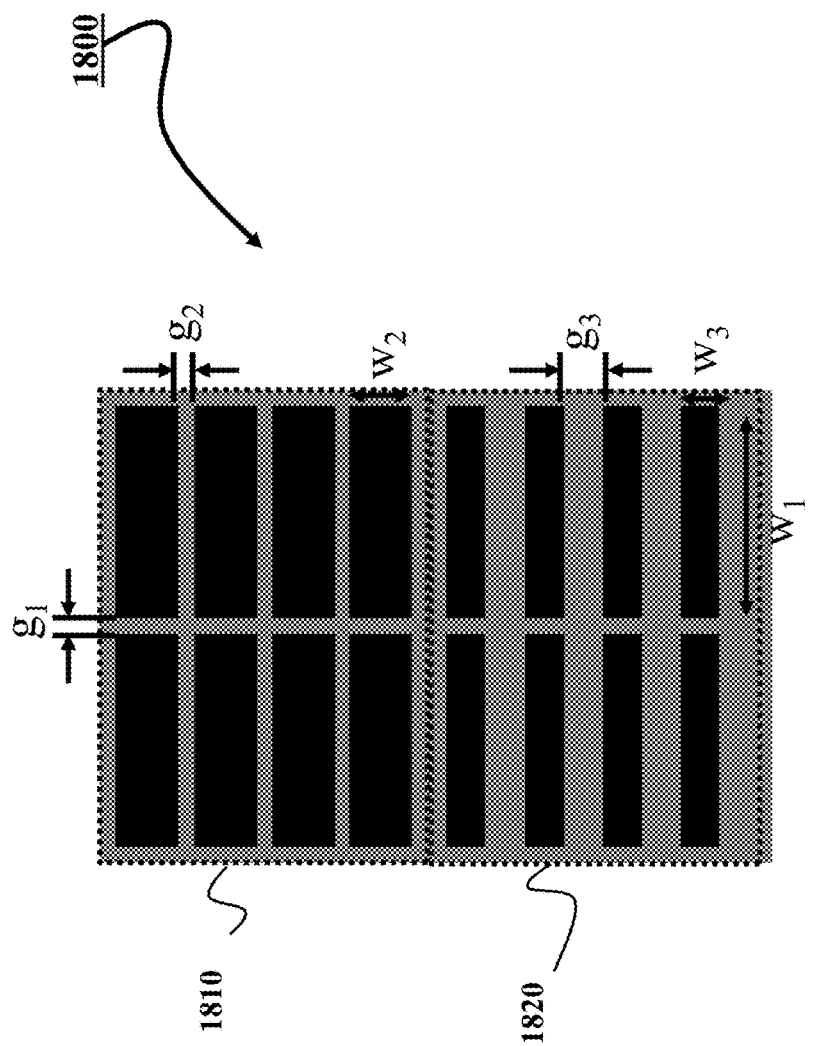
FIG. 18 shows a top view of a compound unit cell used by some embodiments to encode the position using multiple resonant frequencies.

FIG. 18 shows a top view of a compound unit cell used by some embodiments to encode the position using multiple resonant frequencies. In this example, the compound unit cell 1800 includes a first unit cell 1810 having first geometrical parameters and first arrangement of the metallic components selected for a first resonant frequency 1720, and a second unit cell 1820 having second geometrical parameters and second arrangement of the metallic components selected for a second resonant frequency 1720. Notably, at least some the first geometrical parameters of the first unit cell 1810 are different from corresponding second geometrical parameters of the second unit cell 1810 to adapt the unit cells to different resonant frequencies. In this example, the geometrical parameters $w_2$ and $g_2$ are different from corresponding geometrical parameters $w_3$ and $g_3$. By combining and placing different unit cells side-by-side (shown as the upper half and bottom half in the top view of FIG. 18), a new compound unit cell is constructed for the 2-bit barcode.

Figure 19:
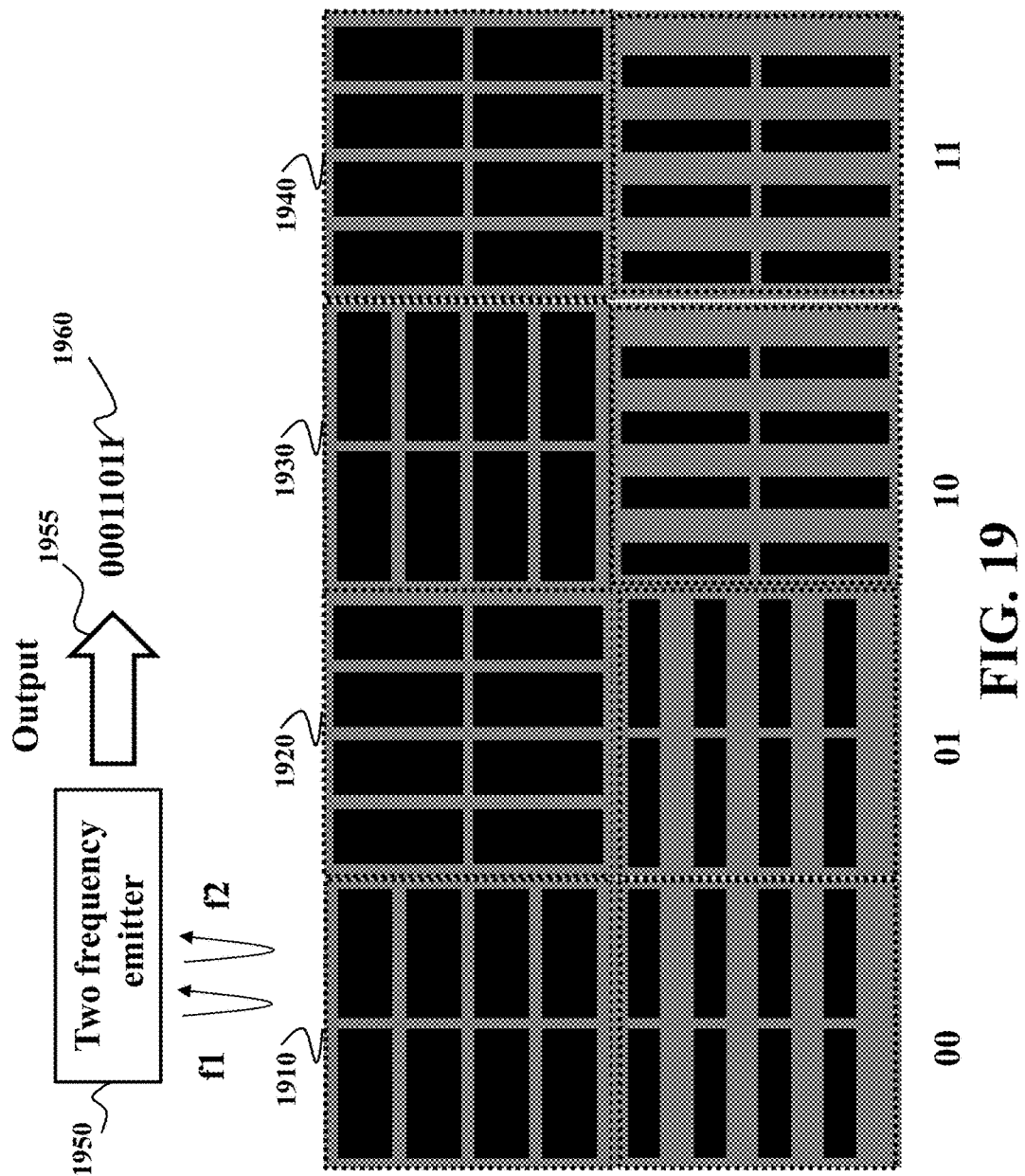
FIG. 19 shows a top view of an arrangement of a plurality of compound unit cells according to some embodiments.

FIG. 19 shows a top view of an arrangement of a plurality of compound unit cells according to some embodiments. Each compound unit cell including unit cells designed for different frequencies. For example, each of the compound unit cells 1910, 1920, 1930, and 1940 includes differently oriented a first unit cell having first geometrical parameters and first arrangement of the metallic components selected for a first resonant frequency, and a second unit cell having second geometrical parameters and second arrangement of the metallic components selected for a second resonant frequency. The orientations of the first and the second unit cells in the compound unit cells define 2-bits of the code encoding the position of the two-frequency emitter 1950 configured to emit waveforms that include a first waveform with the first resonant frequency, and a second waveform with the second resonant frequency.

In the example of FIG. 19, the upper half of the compound unit cells 1910, 1920, 1930, and 1940 corresponds to the resonant frequency $f_1$, and the lower half corresponds to the resonant frequency $f_2$. The emitter 1950 sends signal to the layered structure while having the relative movement along the layered structure in the direction 1955. The signal with frequency components $f_1$ and $f_2$ covers both the upper and lower half of the layered structure and is reflected back to the receiver. from left to right, the compound unit cells shown in the figure corresponds to codes 00, 01, 10, and 11 respectively, according to the loop-up table 1740 as shown in FIG. 17B.

To that end, in some embodiments, the receiver measures amplitudes of the first waveform reflected from the layered structure to produce a first sequence of measurements and measures amplitudes of the second waveform reflected from the layered structure to produce a second sequence of measurements, and the processor combines corresponding measurements of the first and the second waveforms coining from the same compound unit cell to produce multiple bits of the code 1960. In this example, the code is 00011011 after processing and the processor determines the position of the emitter based on the bits of the code.

Figure 20A:
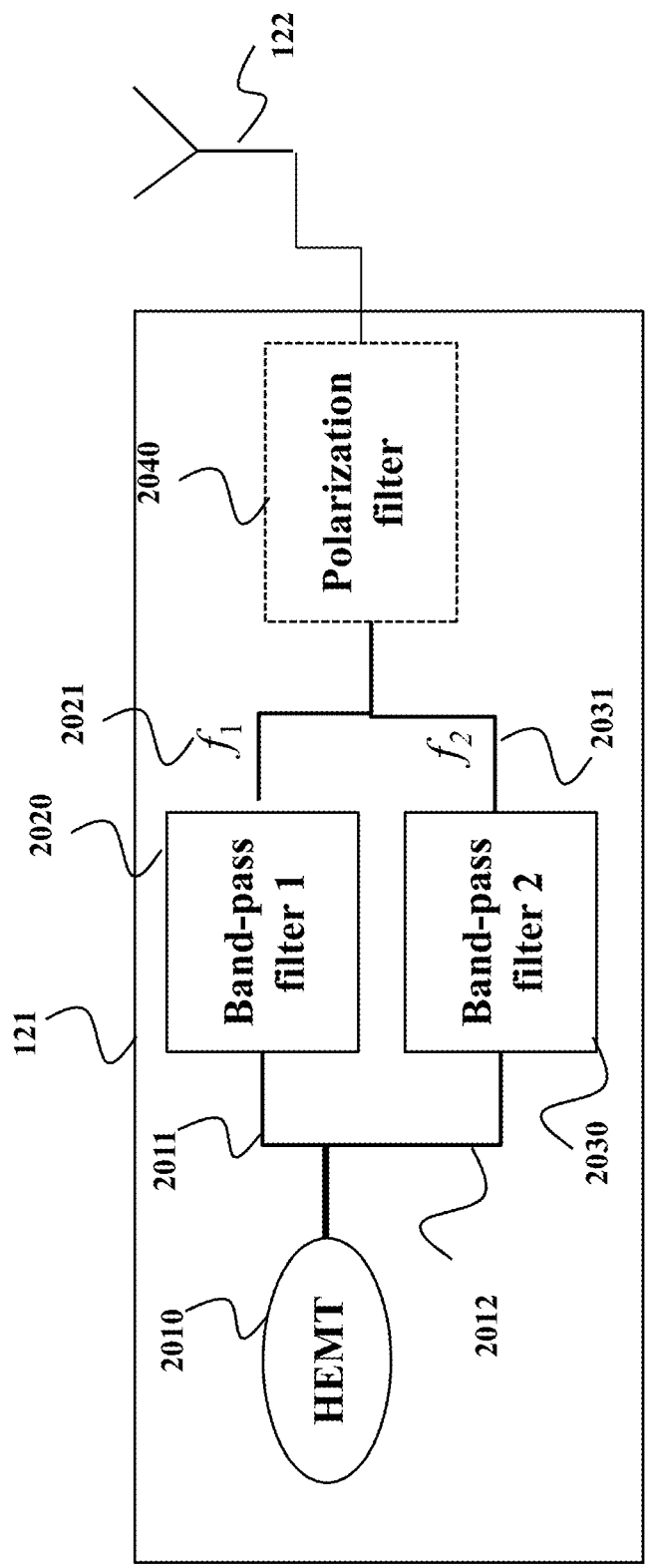
FIG. 20A shows a schematic of an emitter configured to emit transverse waves in accordance with some embodiments.

FIG. 20A shows a diagram of emitter with output signal having two frequency component. The emitter 121 can use various kind of oscillators 125 to produce polarized wave 330 or 340 with frequencies $f_1$ or $f_2$. For example, the emitter can use an electronic oscillator having an electronic circuit that produces a periodic, oscillating electronic signal. For example, the electronic oscillator can use RC oscillator circuit, LC oscillator circuit, and/or crystal oscillator circuit to produce the oscillating wave of specific polarization. Example of such a high-frequency oscillator is the one using high-electron-mobility transistor (HEMT) 2010 used by one embodiment. However, other embodiments use different kinds of high-frequency oscillators.

In some implementations, one or more oscillators 125 are used, depending on the frequency bandwidth of the oscillators. When the bandwidth of the oscillator covers both frequencies $f_1$ and $f_2$, one oscillator may be used. When the bandwidth of the oscillator is not sufficient to cover both $f_1$ and $f_2$, one embodiment uses two oscillators, e.g., one oscillator with output frequency centered at $f_1$, the other with output frequency centered at $f_2$. The signal from the oscillator 2010 can be split into two components 2011 and 2012.

Some embodiments use band pass filters 2020 and 2020 to filter out the other frequency components from the oscillator 2010. After the filters, signals with frequency components $f_1$ 2021 and $f_2$ 2031 are generated. The emitter 121 can optionally use polarization filter 2040 to enforce the polarization of the transverse wave.

In some implementations, the resonant frequency $f_1$ 2021 and $f_2$ 2031 are in a terahertz (THz) spectrum. To that end, in those embodiments, the oscillator 125 is a high frequency oscillator.

Figure 20B:
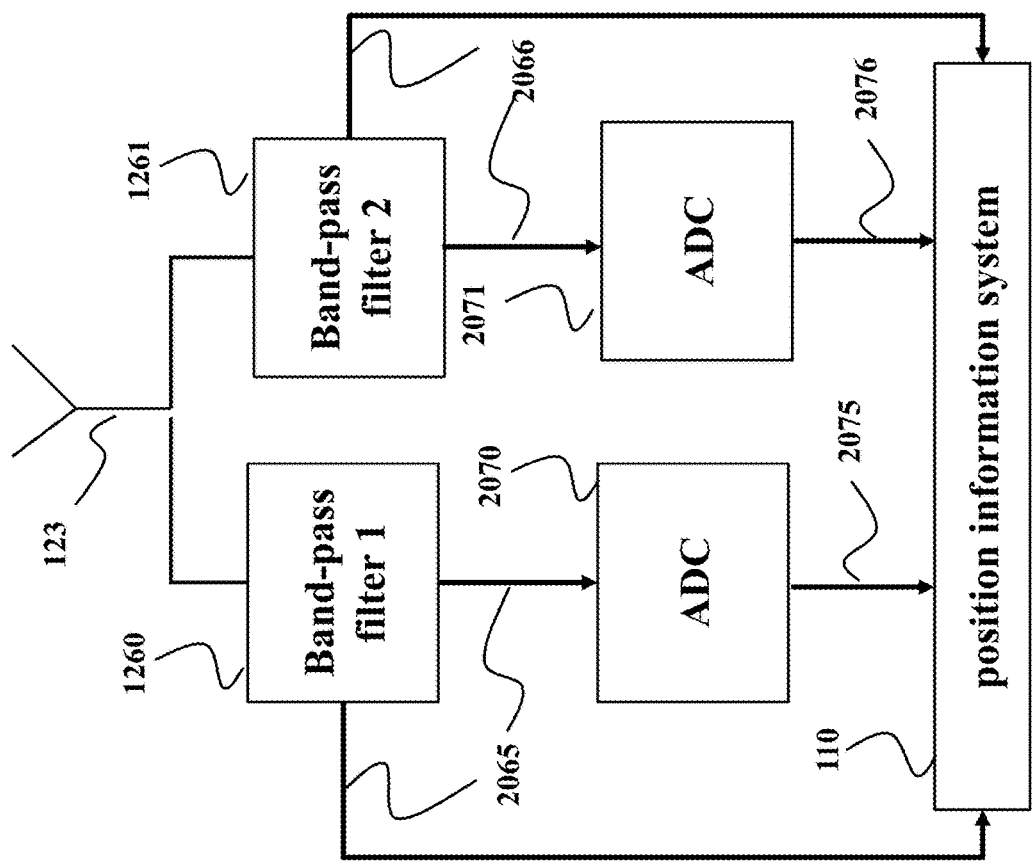
FIG. 20B shows a block diagram of a receiver to measure amplitudes of the waveform reflected from the layered structure according to some embodiments.

FIG. 20B shows a block diagram of a receiver to measure amplitudes of the waveform reflected from the layered structure according to some embodiments with two frequency components. The reflected signal received by the antenna 123 is split into two components and filtered with bandpass filters 1260 and 1261 passing through the frequencies of the polarized signal emitted by the emitter 121. The filter analog signals 2065 and 2066 are directly submitted to the position information system 110 or optionally converted into a digital representation 2075 and 2076 by analog-to-digital converters (ADCs) 2070 and 2071.

Some embodiments are based on recognition that similar concepts can be used to design multi-bit barcode encoding the position. For example, by utilizing two operating frequencies of $f_1$ and $f_2$, and four polarization rotation angles, it is possible to construct a 3-bit barcode.

FIG. 21A shows a lookup table 2105 designed for multi-bit barcode according to one embodiment. In this embodiment, the lookup table 21050 is designed for a 3-bit barcode based on multiple frequencies $f_1$ and $f_2$, and multiple orientations of the cells forming the compound cells. More frequencies and orientations such as polarization rotation angles of 0, 30, 60, and 90 degrees can be used to encode more information into the barcode.

Figure 21B:
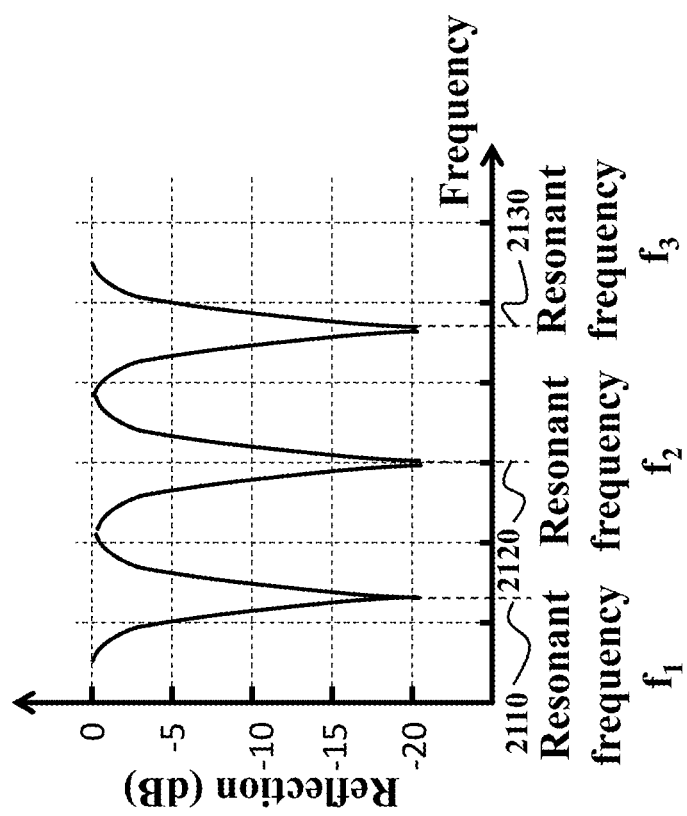

FIGS. 21B and 21C show examples of 3-bit barcode based on multiple frequency and multiple orientations according to one embodiment. In this embodiment, the barcode is based on three different barcodes that resonant at three different frequencies $f_1$ 2110, $f_2$ 2120, and $f_3$ 2130. A transceiver sends polarized signal with frequency components f1, f2, and f3. FIG. 21C shows a lookup table 2140 with exemplar 3-bit codes determines for different combinations polarization rotation angles and frequencies.

Figure 22:
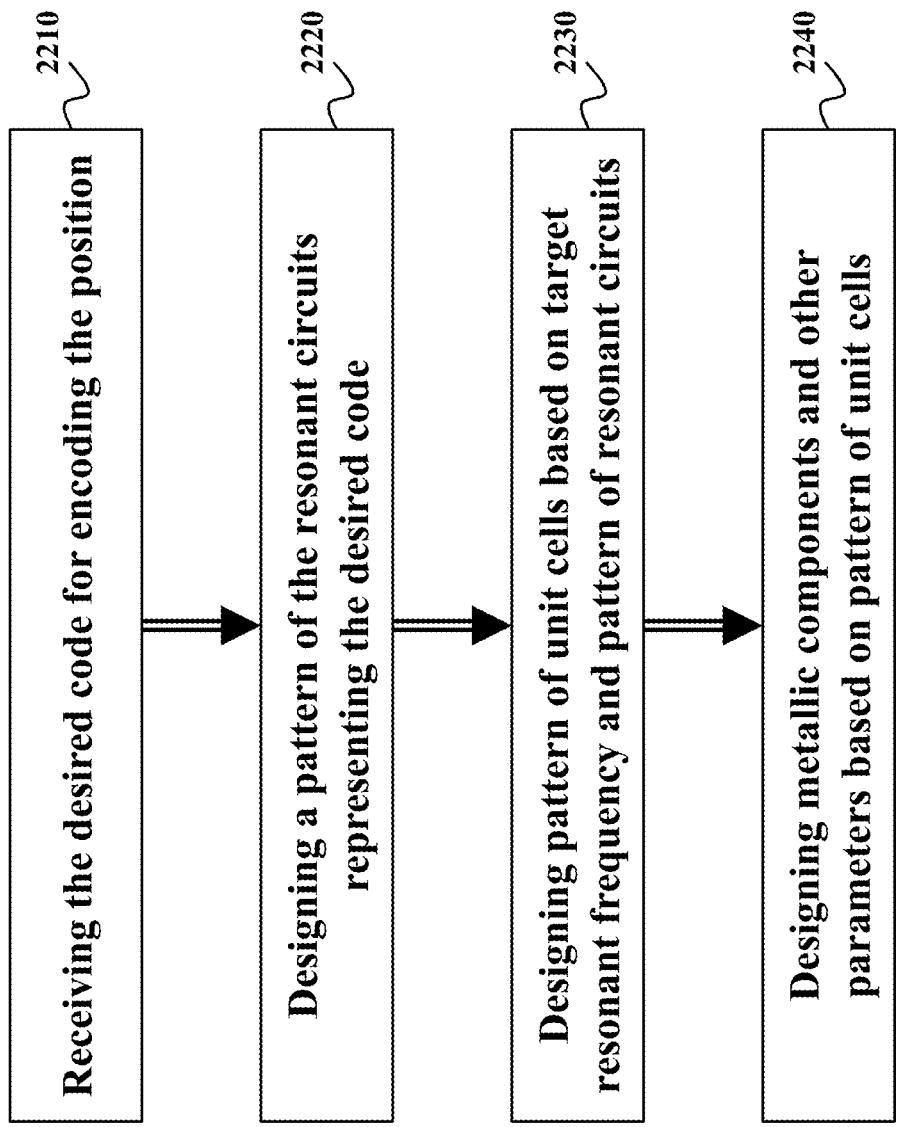
FIG. 22 shows a block diagram of a method for designing a layered structure according to one embodiment.

FIG. 22 shows a block diagram of a method for designing a layered structure according to one embodiment. The method receives 2210 the desired code for encoding the position and designs 2220 a pattern of the resonant circuits representing the desired code. For example, the desired code can be a periodic code to encode a relative position or an absolute code, such as de Bruijn sequence to encode the absolute position. The pattern designed by the method represents, e.g., mimics the desired code.

Knowing the desired pattern or resonant circuits, the method designs 2230 various implementations of unit cells and/or designs 2240 implementations of metallic components to enable the desired pattern. The implementations consider the resonant frequency, the desired resolution and dimensions of the layered structure, etc.

Figure 23:
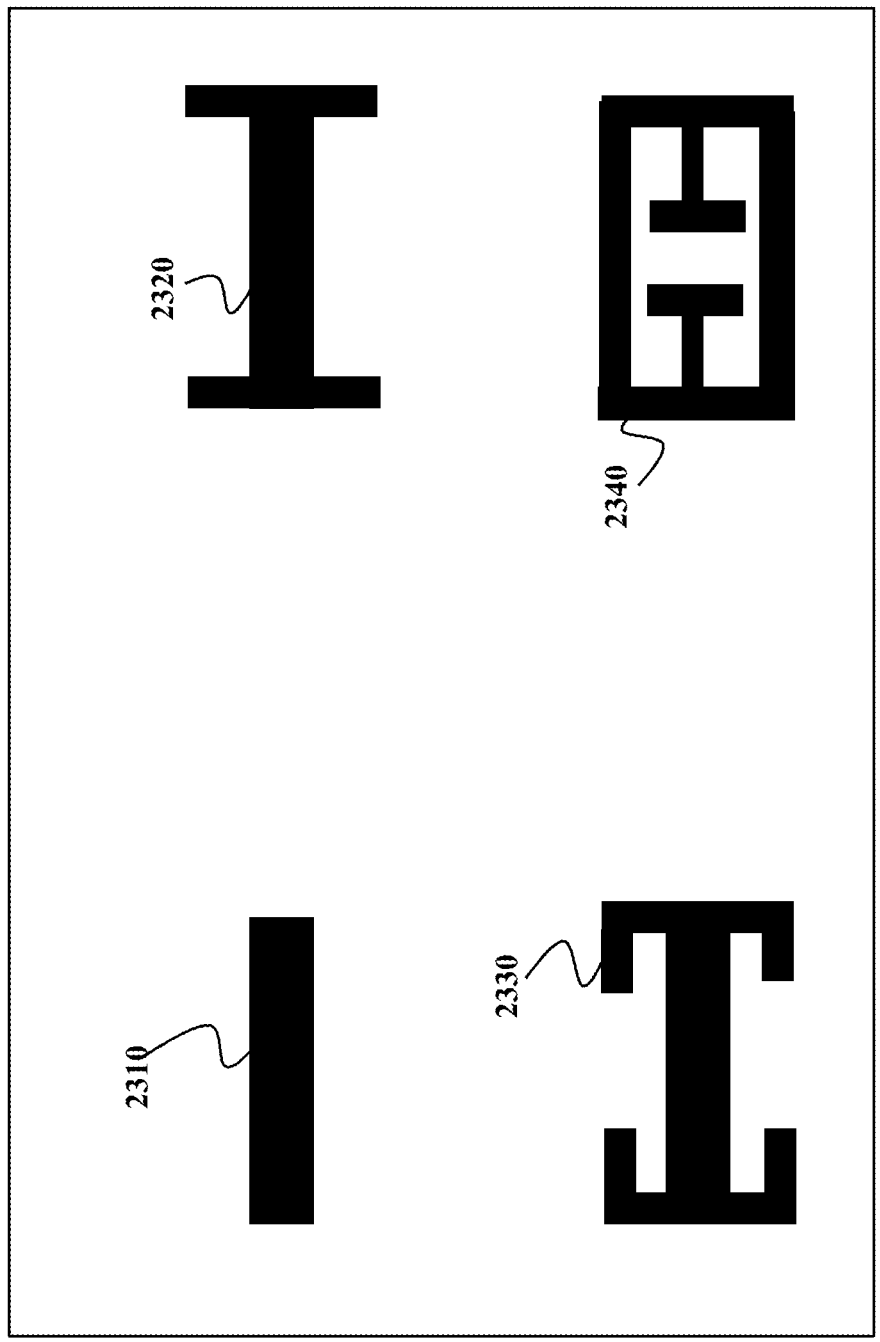
FIG. 23 shows a few examples of metallic components having different shapes to encode positions according some embodiments.

FIG. 23 shows a few examples of metallic components having different shapes to encode positions according some embodiments. For example, the metallic component 2310 is a rectangular patch that is simple to implement. The metallic component 2320 includes the rectangular shape of the component 2310 with two caps added to the two ends of the rectangular patch, mainly to increase the capacitive coupling to neighboring metallic components. The metallic components 2330 and 2340 are both designed to create resonant mode with compact structure sizes.

The more complex structures are used to increase the effective inductance L and effective capacitance C. Such geometrical design flexibilities are helpful when there are specific requirements on the operating frequency, structure size and dimensions.

Figure 24A:
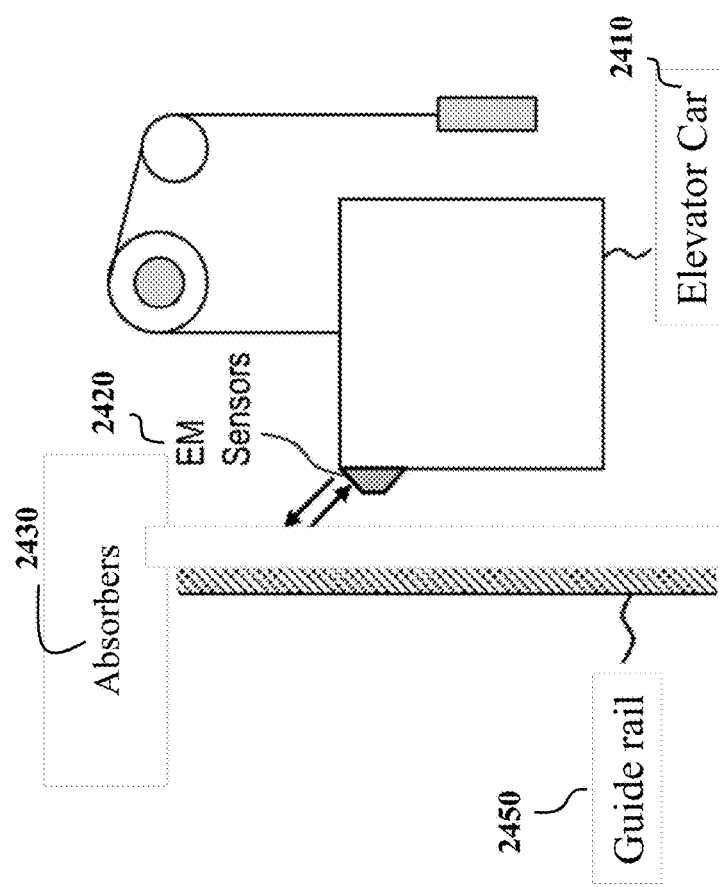
FIG. 24A shows a schematic of elevator system using position encoder according to some embodiments to determine a position of the elevator car.

FIG. 24A shows a schematic of elevator system using position encoder according to some embodiments to determine a position of the elevator car 2410. The layered structure forming the absorbers 2430 is installed at the guide rails 2450. The position detector including emitters and receivers 2420 is installed at the moving elevator car 2410.

Figure 24B:
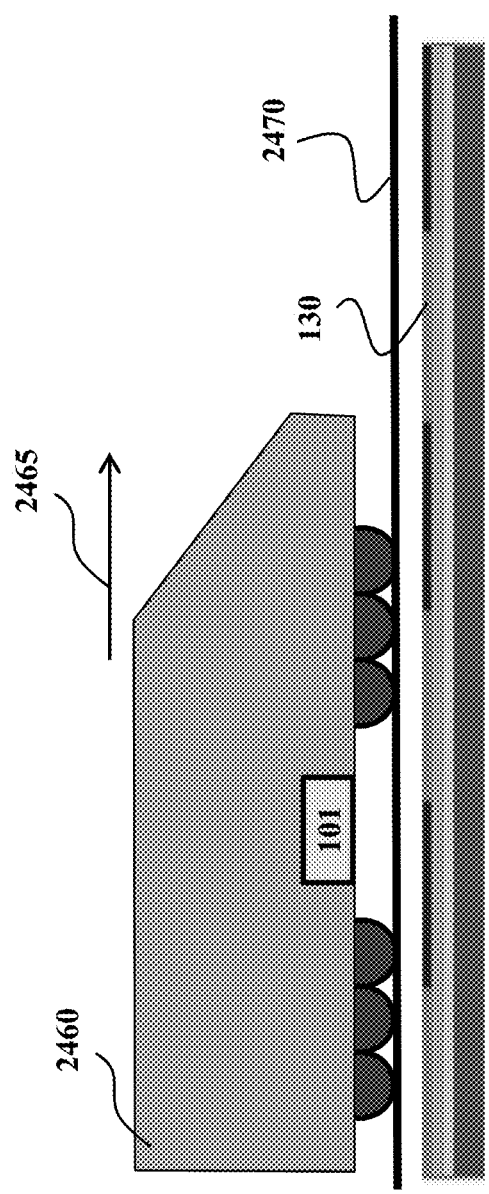
FIG. 24B shows a schematic of a train system using principles of some embodiments to determine a position of a train moving on the railroad track.

FIG. 24B shows a schematic of a train system using position decoder 101 according to some embodiments to determine a position of the train 2460 moving on the railroad track 2470 along the direction 2465. In this embodiment, the position detector 101 is installed on the train 2460, while the layered structure 130 is arranged on the railroad track 2470.

This description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in this description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

We claim:

1. An encoder, comprising:
    a layered structure including a metal plate, a dielectric layer arranged on the metal plate, and a plurality of metallic components arranged on the dielectric layer to form a pattern of resonant circuits;
    an emitter to emit a waveform of a resonant frequency to the layered structure, wherein the waveform is a transverse wave polarized to oscillate along a direction of polarization;
    a receiver to measure amplitudes of the waveform reflected from the layered structure;
    a memory to store data relating positions of the emitter with amplitudes of the reflected waveform based on the pattern of the resonant circuits formed by the layered structure;
    a processor to determine a position of the emitter from the measurements of the amplitudes based on the data; and
    an output interface to render the position of the emitter.

2. The encoder of claim 1, wherein the metallic components are arranged on the dielectric layer to form a periodic pattern of resonant circuits with identical characteristics separated from each other with a constant distance to encode a relative position of the emitter, wherein the data include a signal model of the s waveform reflected from the layered structure forming the periodic pattern of resonant circuits with the identical characteristics, wherein the processor determines the position from the measurements of the amplitudes based on the signal model.

3. The encoder of claim 1, wherein the metallic components are arranged on the dielectric layer to form a non-periodic pattern of resonant circuits with identical characteristics to encode an absolute position of the emitter, wherein the data include a mapping between sequences of amplitude values and the position of the emitter, the mapping is a function of the non-periodic pattern of resonant circuits, and wherein the processor maps the measurements of the amplitudes to the position of the emitter according to the mapping.

4. The encoder of claim 1, wherein a group of metallic components form a unit cell encoding the position, wherein the layered structure includes a plurality of unit cells, and wherein the data stored in the memory include a code defined by one or combination of positions and orientations of the unit cells.

5. The encoder of claim 1, wherein the position and the orientations of the unit cell defines one bit of the code.

6. The encoder of claim 1, wherein the position and the orientations of the unit cell defines two bits of the code.

7. The encoder of claim 4, wherein the unit cells have the same orientation with respect to the polarization of the waveform, wherein a portion of the layered structure occupied by the unit cell absorbs at least a portion of the waveform, and wherein a portion of the layered structure free from the unit cell reflects the polarized waveform from the metallic plate.

8. The encoder of claim 4, wherein at least some unit cells have different orientations with respect to the polarization of the waveform including a reflecting orientation and an absorbing orientation, wherein a unit cell with the absorbing orientation absorbs the incident polarized waveform, and wherein a unit cell with the reflecting orientation reflects the incident polarized waveform.

9. The encoder of claim 8, wherein, in the unit cell with the absorbing orientation, the longest dimension of the metallic components forming the unit cell is aligned with the direction of polarization, wherein, in the unit cell with the reflecting orientation, the longest dimension of the metallic components forming the unit cell is perpendicular to the direction of polarization.

10. The encoder of claim 9, wherein at least some unit cells have intermediate orientations between the reflecting orientation and the absorbing orientations.

11. The encoder of claim 10, wherein the unit cells have a squared outline formed by non-squared metallic components.

12. The encoder of claim 4, wherein geometrical parameters and arrangement of the metallic components forming the unit cell are functions of the resonant frequency, such that a metallic component of the unit cell forms an inductor with inductance governed by the resonant frequency, and at least two metallic s components of the unit cell are positioned at a distance to each other to form a capacitor with capacitance governed by the resonant frequency.

13. The encoder of claim 12, wherein the layered structure includes a plurality of compound unit cells, each compound unit cell including a first unit cell having first geometrical parameters and first arrangement of the metallic components selected for a first resonant frequency, and a second unit cell having second geometrical parameters and second arrangement of the metallic components selected for a second resonant frequency, wherein the waveform emitted by the emitter includes a first waveform with the first frequency, and a second waveform with the second frequency, wherein the receiver measures amplitudes of the first waveform reflected from the layered structure to produce a first sequence of measurements and measures amplitudes of the second waveform reflected from the layered structure to produce a second sequence of measurements, and wherein the processor combines corresponding measurements of the first and the second waveforms coining from the same compound unit cell to produce multiple bits of the code and determines the position of the emitter based on the bits of the code.

14. The encoder of claim 1, wherein the data include one or combination of positions of the resonant circuits with respect to each other, resonant frequencies of the resonant circuits with respect to the resonant frequency of the waveform, and orientations of resonant circuits with respect to the direction of the polarization of the waveform.

15. The encoder of claim 1, wherein the resonant frequency is in a THz spectrum.

16. A method for position encoding, comprising
emitting by an emitter a waveform of a resonant frequency to a layered structure, wherein the waveform is a transverse wave polarized to oscillate along a direction of polarization, wherein the layered structure includes a metal plate, a dielectric layer arranged on the metal plate, and a plurality of metallic components arranged on the dielectric layer to form a pattern of resonant circuits;

measuring by a receiver amplitudes of the waveform reflected from the layered structure;

retrieving from a memory data relating positions with amplitudes of the reflected waveform based on the pattern of the resonant circuits formed by the layered structure;

determining by a processor a position of the emitter from the measurements of the amplitudes based on the data; and rendering the position of the emitter to an output interface.

* * * * *